United States Patent
Vuorinen et al.

(10) Patent No.: US 9,410,285 B2
(45) Date of Patent: Aug. 9, 2016

(54) METHOD FOR CATALYTIC OXIDATION OF CELLULOSE AND METHOD FOR MAKING A CELLULOSE PRODUCT

(75) Inventors: Tapani Vuorinen, Espoo (FI); Timo Pääkkönen, Helsinki (FI); Markus Nuopponen, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/124,520

(22) PCT Filed: Jun. 8, 2012

(86) PCT No.: PCT/FI2012/050573
§ 371 (c)(1),
(2), (4) Date: Dec. 6, 2013

(87) PCT Pub. No.: WO2012/168562
PCT Pub. Date: Dec. 13, 2012

(65) Prior Publication Data
US 2014/0110070 A1    Apr. 24, 2014

(30) Foreign Application Priority Data

Jun. 9, 2011 (FI) .................................... 20115566

(51) Int. Cl.
| | | |
|---|---|---|
| C08B 15/02 | (2006.01) | |
| D21C 3/00 | (2006.01) | |
| D21C 9/00 | (2006.01) | |
| C08B 15/04 | (2006.01) | |

(52) U.S. Cl.
CPC ............... *D21C 3/003* (2013.01); *C08B 15/04* (2013.01); *D21C 9/002* (2013.01); *D21C 9/007* (2013.01)

(58) Field of Classification Search
CPC ........ D21C 9/001; D21C 9/002; D21C 9/004; D21C 9/005
See application file for complete search history.

(56) References Cited

U.S. PATENT DOCUMENTS

| | | | |
|---|---|---|---|
| 6,379,494 B1 * | 4/2002 | Jewell et al. | ...................... 162/9 |
| 6,716,976 B1 | 4/2004 | Jetten et al. | |
| 2012/0297555 A1 * | 11/2012 | Chen et al. | ........................ 8/194 |

FOREIGN PATENT DOCUMENTS

| | | |
|---|---|---|
| AT | 501929 A1 | 12/2006 |
| EP | 1 264 845 A2 | 12/2002 |
| EP | 1264845 A2 | 12/2002 |
| EP | 1264846 A1 | 12/2002 |
| EP | 2022802 A1 | 2/2009 |
| EP | 2216345 A1 | 8/2010 |

(Continued)

OTHER PUBLICATIONS

Anelli et al., "Fast and Selective Oxidation of Primary Alcohols to Aldehydes or to Carboxylic Acids and of Secondary Alcohols to Ketones Mediated by Oxoammonium Salts under Two-Phase Conditions," *Journal of Organic Chemistry*, vol. 52, pp. 2559-2562, 1987.

(Continued)

*Primary Examiner* — Anthony Calandra
(74) *Attorney, Agent, or Firm* — Oliff PLC

(57) ABSTRACT

In a method for catalytic oxidation of cellulose a heterocyclic nitroxyl radical is used as catalyst, hypochlorite is used as main oxidant acting as oxygen source, and a tertiary amine or chlorine dioxide as an activator of the heterocyclic nitroxyl radical.

47 Claims, 11 Drawing Sheets

(56) References Cited

FOREIGN PATENT DOCUMENTS

| | | | |
|---|---|---|---|
| EP | 2 226 414 A1 | 9/2010 | |
| JP | 2003073402 A | 3/2003 | |
| JP | 2003089701 A | 3/2003 | |
| JP | 2009161613 A | 7/2009 | |
| JP | 2010535869 A | 11/2010 | |
| WO | WO 01/29309 A1 | 4/2001 | |
| WO | 2009069641 A1 | 6/2009 | |
| WO | WO 2011/024807 A1 | 3/2011 | |

OTHER PUBLICATIONS

Zhao et al., "Oxidation of Primary Alcohols to Carboxylic Acids With Sodium Chlorite Catalyzed by Tempo and Bleach: 4-Methoxyphenylacetic Acid," *Organic Synthesis*, vol. 81, pp. 195-203 and Drawing, 2005.

Saito et al., "Cellulose Nanofibers Prepared by TEMPO-Mediated Oxidation of Native Cellulose," *Biomacromolecules*, vol. 8, pp. 2485-2491, 2007.

International Preliminary Report on Patentability Issued in Application No. PCT/FI2012/050573; Dated Oct. 8, 2013.

International Search Report issued in Application No. PCT/FI2012/050573; Dated Oct. 17, 2012.

Sreedevi Mannam et al., "Aerobic, Chemoselective Oxidation of Alcohols to Carbonyl Compounds Catalyzed by a DABCO-Copper Complex under Mild Conditions," Adv. Synth. Catal., 2007, 349, 2253-2258.

Nan Jiang et al., "Cu(II)-Catalyzed Selective Aerobic Oxidation of Alcohols Under Mild Conditions," J. Org. Chem, 2006,7087-7090.

May 24, 2016 Office Action issued in Japanese Application No. 2014-514122.

* cited by examiner

METHOD FOR CATALYTIC OXIDATION OF CELLULOSE AND METHOD FOR MAKING A CELLULOSE PRODUCT

FIELD OF THE INVENTION

The invention relates to a method for catalytic oxidation of cellulose using a heterocyclic nitroxyl radical as catalyst.

BACKGROUND OF THE INVENTION

Cellulose is a renewable natural polymer that can be converted to many chemical derivatives. The derivatization takes place mostly by chemical reactions of the hydroxyl groups in the β-D-glucopyranose units of the polymer. By chemical derivatization the properties of the cellulose can be altered in comparison to the original chemical form while retaining the polymeric structure. Reaction selectivity is important so that a derivative of desired chemical structure could be obtained.

Heterocyclic nitroxyl compounds are known as catalysts that participate in the selective oxidation of C-6 hydroxyl groups of cellulose molecules to aldehydes and carboxylic acids, the corresponding oxoammonium salt being known as the active direct oxidant in the reaction series. One of these chemical oxidation catalysts known for a long time is "TEMPO", i.e. 2,2,6,6-tetramethylpiperidinyl-1-oxy free radical. Thus, the oxidized forms of the nitroxyl radicals, N-oxoammoniumions, act as direct oxidants in the oxidation of the target cellulose molecule, whereas a main oxidant is used to bring oxygen to the reaction series and convert the nitroxyl compound back to the oxidized form.

It is known to oxidize primary alcohols to aldehydes and carboxylic acids through "TEMPO" by using sodium hypochlorite as the main oxidant (for example Anelli, P. L.; Biffi, C.; Montanari, F.; Quici, S.; *J. Org. Chem.* 1987, 52, 2559). To improve the yield in the oxidation of the alcohols to carboxylic acids, a mixture of sodium hypochlorite and sodium chlorate was also used (Zhao, M. M.; Li, J.; Mano, E.; Song, Z. J.; Tschaen, D. M.; *Org. Synth.* 2005, 81, 195).

It is also known procedure to catalytically oxidize cellulose in native cellulose fibers through "TEMPO" by using sodium hypochlorite as main oxidant (oxygen source) and sodium bromide as activator (Saito, T. et al.; Cellulose Nanofibers Prepared by TEMPO-Mediated Oxidation of Native Cellulose, *Biomacromolecules* 2007, 8, 2485-2491). The primary hydroxyl groups (C6-hydroxyl groups) of the cellulosic β-D-glucopyranose units are selectively oxidized to carboxylic groups. Some aldehyde groups are also formed from the primary hydroxyl groups. When the fibers of oxidized cellulose so obtained are disintegrated in water, they give stable transparent dispersion of individualized cellulose fibrils of 3-5 nm in width, that is, nanofibrillated cellulose (NFC) or "nanocellulose".

The use of sodium bromide as activator is preferred because it accelerates the reaction. For example WO01/29309 recommends to use 3 parts by weight NaBr to 4 parts of NaOCl. In the reaction series, the bromide ion acts as oxygen mediator between the main oxidant and the nitroxyl radical by oxidation to hypobromite and reduction back to bromide.

The use of bromine compounds in the oxidation reaction is problematic because of environmental concerns. Sodium bromide is usually used in the reaction mixture in relatively large amounts and it is difficult to remove bromide residues from the final cellulose product. Bromine compounds also accumulate in process waters. Further, the use of bromine in industrial scale is undesirable. Use of large amounts of sodium bromide cause corrosion problems in the equipment. Bromine compounds are generally recognized as hazardous to health, for example bromate which is formed as a result of side reactions is a suspected carcinogen.

SUMMARY OF THE INVENTION

It is a purpose of the invention to provide a method for effectively and selectively oxidizing the C-6 hydroxyl groups of cellulose by avoiding the use of bromine compounds.

One purpose of the invention is to avoid excessive use of chemicals and to provide an economical method for the oxidation of cellulose.

It is a further object to provide a method for making a cellulose product without the use of bromine compounds.

In the catalytic oxidation of cellulose, the heterocyclic nitroxyl radical is activated by a tertiary amine or chlorine dioxide.

By a proper choice of the activator the nitroxyl radical can be activated to the oxidized state without the use of bromide.

Bromine compounds, especially sodium or potassium bromide, can be replaced by a tertiary amine compound which acts as cocatalyst and activates the heterocyclic N-nitroxyl compound. In this role, the tertiary amine, which has the general formula RR'R"N, alternates between oxidized form, quaternary ammonium cation RR'R"N$^+$ and reduced form, the tertiary amine RR'R"N. Suitable tertiary amines are cyclic amines, such as hexamethylenetetramine, 1,4-diazabicyclo[2,2,2]octane (DABCO) and quinuclidine. Hypochlorite can be used as the main oxidant. The consumption of tertiary amine is clearly lower compared with the consumption of bromides in conventional methods.

According to another embodiment, chlorine dioxide is used as the activator of the heterocyclic N-nitroxyl compound. The main oxidant is hypochlorite. It is preferable to perform the oxidation reaction in a two-step process where in the first step, at a neutral or basic pH, chlorine dioxide is used as the activator and hypochlorite, for example sodium hypochlorite (NaClO), as the main oxidant. In a second step, the pH is made acidic and the remaining aldehyde groups of cellulose are oxidized to carboxylic groups by chlorite, for example sodium chlorite (NaClO$_2$). By using the two step method in the ClO$_2$ activation, the selectivity can be improved and the total oxidation time from hydroxyl to carboxylate can be made shorter. Further, the oxidation is more controlled and avoids the breakage of cellulose and the decrease of the DP value. Thus, if the end product is fibrous product the fiber length can be better retained.

After the cellulose is subjected to oxidation in one of the above-mentioned methods, it can be processed to a final cellulose product. When the starting material is pulp derived from plants, especially wood, the cellulose exists in fiber form. The fibers that contain the cellulose in oxidized form are easy to disintegrate by mechanical methods to small-scaled fragments, nanofibrillar cellulose (NFC). The method for forming the cellulose product comprises the first process of catalytic oxidation of the fibrous starting material and the second process of disintegration the oxidized starting material to nanofibrillar cellulose.

BRIEF DESCRIPTION OF THE DRAWINGS

In the following, the invention will be described with reference to the appended drawings, which show results of oxidation experiments.

DETAILED DESCRIPTION OF THE INVENTION

Figure 1:
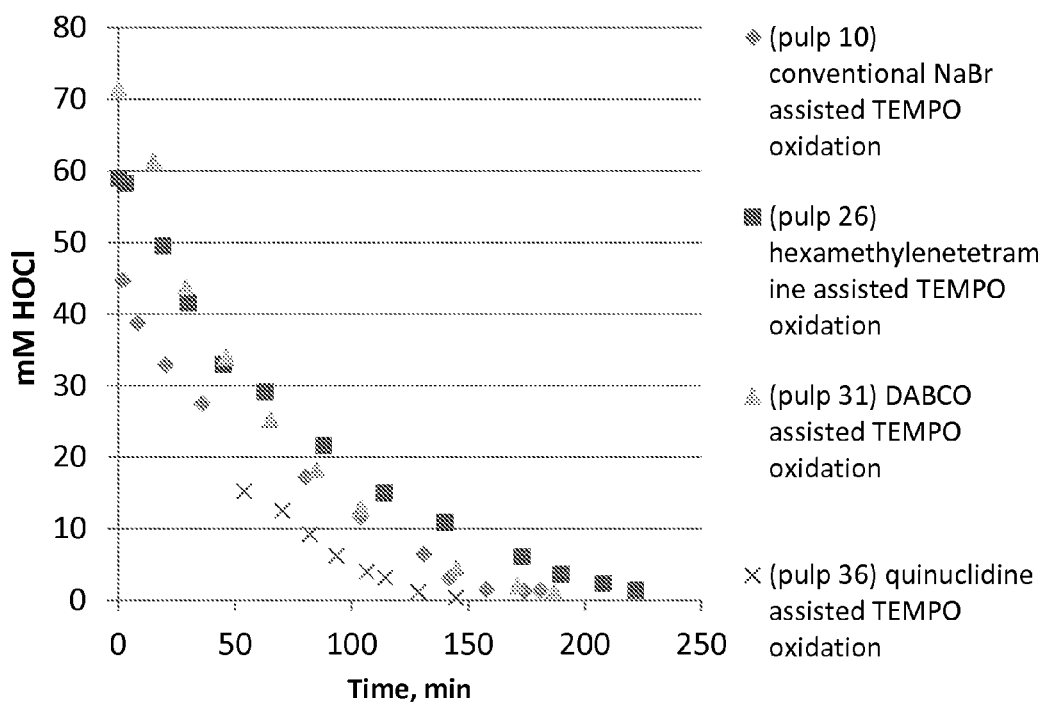

In the following disclosure, all percent values are by weight, if not indicated otherwise. Further, all numerical ranges given include the upper and lower values of the ranges, if not indicated otherwise.

In the invention, the primary hydroxyl groups of cellulose are oxidized catalytically by a heterocyclic nitroxyl compound, for example 2,2,6,6-tetramethylpiperidinyl-1-oxy free radical, "TEMPO". Other heterocyclic nitroxyl compounds known to have selectivity in the oxidation of the hydroxyl groups of C-6 carbon of the glucose units of the cellulose can also be used, and these compounds are widely cited in the literature. Hereinafter, the oxidation of cellulose refers to the oxidation of these hydroxyl groups to aldehydes and/or carboxyl groups. It is preferred that the hydroxyl groups are oxidized to carboxyl groups, that is, the oxidation is complete.

Whenever the catalyst "TEMPO" is mentioned in this disclosure, it is evident that all measures and operations where "TEMPO" is involved apply equally and analogously to any derivative of TEMPO or any heterocyclic nitroxyl radical capable of catalyzing selectively the oxidation of the hydroxyl groups of C-6 carbon in cellulose.

In the following description, catalytic oxidation refers to nitroxyl-mediated (such as "TEMPO"-mediated) oxidation of hydroxyl groups. The catalytic oxidation of fibers or fibrous material in turn refers to material which contains cellulose that is oxidized by nitroxyl-mediated (such as "TEMPO"-mediated) oxidation of hydroxyl groups of the cellulose.

The terms step and phase are used in this disclosure interchangeably, that is, first step and second step are equal to first phase and second phase respectively, unless the text passage in question indicates other interpretation.

According to the first embodiment, the cellulose is oxidized catalytically by using hypochlorite as main oxidant and tertiary amine as cocatalyst. The presumed route is shown in the following scheme 1 (the heterocyclic nitroxyl catalyst is represented by $R'_2NOH$ in its reduced form and $R'_2N^+0$ in its oxidized form).

Oxidation of Alcohol

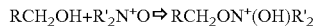
$$RCH_2OH + R'_2N^+O \Rightarrow RCH_2ON^+(OH)R'_2$$

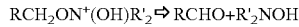
$$RCH_2ON^+(OH)R'_2 \Rightarrow RCHO + R'_2NOH$$

Formation of Chlorammmonium

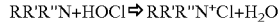
$$RR'R''N + HOCl \Rightarrow RR'R''N^+Cl + H_2O$$

Reoxidation of TEMPO

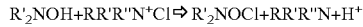
$$R'_2NOH + RR'R''N^+Cl \Rightarrow R'_2NOCl + RR'R''N + H^+$$

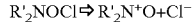
$$R'_2NOCl \Rightarrow R'_2N^+O + Cl^-$$

Oxidation of Aldehyde

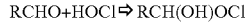
$$RCHO + HOCl \Rightarrow RCH(OH)OCl$$

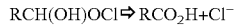
$$RCH(OH)OCl \Rightarrow RCO_2H + Cl^-$$

Scheme 1. TEMPO—catalyzed bleach-oxidation of alcohols using amine as cocatalyst The method is a one-step process where all reagents for achieving the oxidation are in the same reaction medium. However, the selectivity of the oxidation is higher when the main oxidant, NaClO is added in portions. The amine cocatalyst can also be added in portions during the reaction time, which increases the selectivity of the oxidation reaction (higher amount of COOH groups/g pulp). The pH used is slightly basic, 8 to 9.5, preferably 8.5 to 9.0. In these pH values, best balance between the rate of oxidation and selectivity was obtained. Any pH value between 7 and 10, these values included, can also be used. Preferably buffer is used in the reaction medium to keep the pH in the desired range, or alternatively, the pH is adjusted by adding alkaline agent to compensate for the acidity caused by the generated carboxyl groups.

The temperature of the reaction medium can be between 20 and 50° C.

Suitable tertiary amines are hexamethylenetetramine, 1,4-diazabicyclo[2,2,2]octane (DABCO) and quinuclidine. However, the invention is not limited to the use of these amines as cocatalysts. Other stable amines, especially stable cyclic amines can be used.

According to a second embodiment, chlorine dioxide is used as the activator of the heterocyclic N-nitroxyl compound. The main oxidant is hypochlorite. The oxidation process is a two-step process where in the first step the nitroxyl catalyst is activated with chlorine dioxide and hypochlorite is used as the main oxidant. The reaction proceeds rapidly and produces partly aldehyde groups. The pH in the first phase is preferably between 7.5 and 8.5, these values included, but a wider range, from 6 to 10, may also be used. Compared with other activating methods, the activation with $ClO_2$ improves the oxidation selectivity outstandingly.

When the first step has proceeded to so that a desired conversion degree is reached, the first step is stopped. The partly oxidized cellulose can be washed and the second step is performed in a reaction medium where the pH is clearly on acidic side, about 1.5-4, preferably 2-3. Preferably the second step is performed at a pH below 3. The stop point of the first step can be chosen according to the consumption of the main oxidant or any other way. Alternatively, the pH of the reaction medium of the first step can be lowered directly to the pH range of the second step at the stop point.

When the pH is lowered, chlorite, for example $NaClO_2$, is added to the reaction medium. In this second step, the remaining aldehyde groups are rapidly oxidized to carboxyl groups with chlorite as the main oxidant. Dimethyl sulfoxide (DMSO) can be used in the reaction medium in the second step to eliminate the formation of hypochlorite from chlorite.

Usually the first step is stopped when the carboxylate content of 0.8-1.0 mmol/g pulp is reached. The second step increases the carboxylate content by completing the oxidation.

By the combination of first and second steps the overall reaction from hydroxyl groups until carboxyl groups is fast with good selectivity. The activation of the nitroxyl radical (for example "TEMPO" radical) to oxidized form by $ClO_2$ and further oxidation of C6 hydroxyl groups of pulp by hypochlorite as the main oxidant is a selective and fast reaction if all available hydroxyl groups are not oxidized. The residual aldehydes can be converted to carboxylates by the further acid phase (the second step). The acid phase in the end is preferable also in the sense that the oxidized pulp is easier to wash at acidic conditions.

The temperature in the first step can be between 20 and 50° C. and in the second step between 20 and 80° C., preferably 40 and 80° C. The optimum temperature of the second step is about 50° C.

The reaction scheme of the first step of the second embodiment is given below in scheme 2. Chlorine dioxide is needed only for the conversion of the catalyst from the radical form to the active, oxidized form.

Alternatively, in the second embodiment, any of the tertiary amines mentioned above can be used in the first step as activators of the catalyst instead of ClO$_2$. Although the conversion of aldehydes to carboxyl groups is faster when amine is used, the selectivity is not as high as with chlorine dioxide as activator. The two-phase catalytic oxidation method where chlorine dioxide and hypochorite are used in the first step and chlorite in the second step seems to be the best alternative with regard to both selectivity and reaction rate. It also results to the lowest consumption of reagents.

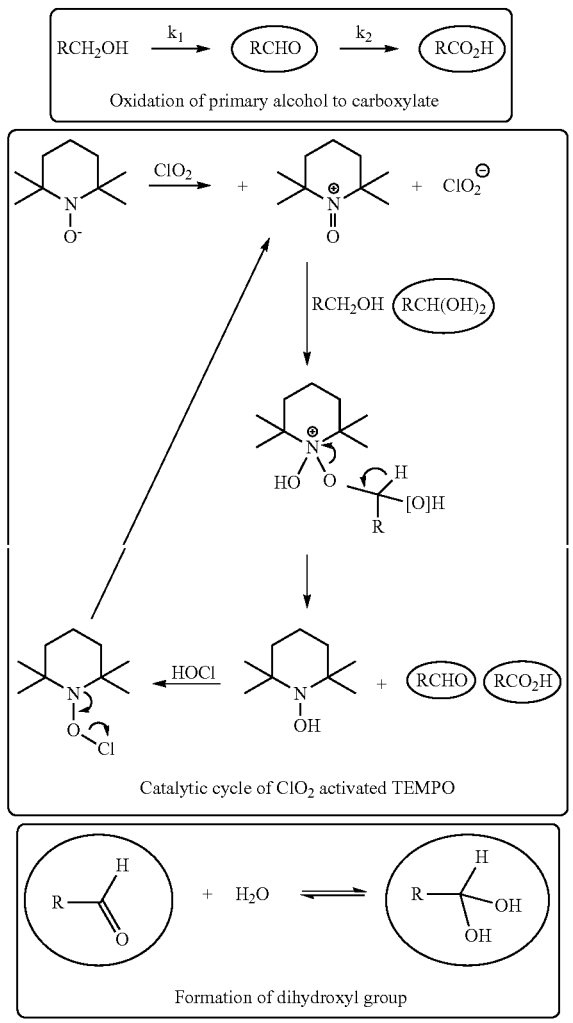

The conversion of residual aldehydes to carboxyl groups by oxidation in the second step of the second embodiment stabilizes the oxidized cellulose. The reaction scheme is shown below.

Scheme 3. Chemical oxidation of aldehyde to carboxylic acid by chlorite.

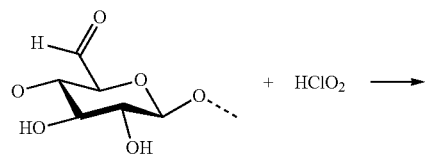

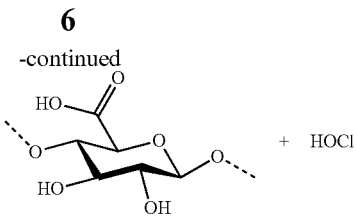

The chlorite is in the form of chlorous acid (HClO$_2$, pKa 1.96) in acidic conditions. The chlorous acid oxidizes the aldehyde groups of the cellulose to carboxylic acid groups. A typical pH range for this reaction is 2-4.

Thus, in the two-step oxidation process, aldehyde and carboxyl groups are made in the C6 carbon of the cellulose using the heterocyclic nitroxyl radical as catalyst in a first step, and in the second step residual aldehydes are converted to carboxylic acids chemically by means of the chlorite. The advantage of this two-step process is cellulose product of higher strength, because degradation of polymer chains due to β-elimination reactions can be largely avoided. Especially in view of making nanofibrillated cellulose (NFC) by mechanical disintegration of the fibrous oxidized material, the quality of the final product is improved, because degradation of cellulose is minimized, the neutral aldehyde groups which do not contribute to the fibrillation are practically absent, and chemical instability of the final product due to the aldehyde groups is improved for the same reason.

Although the second step in the two-step oxidation process is selective, a problem arises from the side reactions of the chlorite, which consume the reactant in excess amount and lead to the formation of harmful gases chlorine and chlorine dioxide. In the side reactions, hypochlorous acid is generated in the reaction between the cellulose aldehyde group and chlorous acid (scheme 3 above) and as result of unwanted decomposition reactions of the chlorous acid. The hypochlorous acid in turn causes the formation of the chlorine and chlorine dioxide through various reactions. However, the side reactions and problems associated therewith can be avoided by performing the second step in the presence of a protective substance, and the reaction between aldehyde and chlorite can be carried out in almost stoichiometric proportion (1:1) without side reactions.

The protective substance which is used in the reaction medium of the second step is capable of inactivating the hypochlorous acid formed so that it does not give rise to the side reactions. Dimethyl sulfoxide (DMSO) and dimethyl sulfide (DMS) are efficient hypochlorous acid catchers, the former one being preferred because it is odorless and less volatile. The DMSO and DMS eliminate the hypochlorous acid as soon as it is formed according to the following reaction scheme 4. Thus, unwanted side reactions can be prevented by removing the hypochlorous acid form the process chemically.

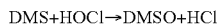
DMS+HOCl→DMSO+HCl

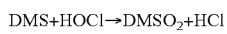
DMS+HOCl→DMSO$_2$+HCl

Scheme 4. Capture of hypochlorous acid by dimethylsulfide or dimethylsulfoxide in the oxidation process.

To recover chemicals, the reaction media are preferably recycled at least partly after each step in the two-step process, after the separation of the cellulose. Makeup chemicals are added upon need.

The reaction medium in all methods described above is preferably water where the reagents and raw materials can be dissolved or dispersed.

In industrial scale, the oxidation reactions can be performed either batchwise or continuously, and the dosage of reagents can be adapted accordingly.

In the present application all results shown and calculations made, whenever they are related to the amount of pulp, are made on the basis of dried pulp. Further, all chemicals were dosed to the dried pulp. It is believed that when never dried pulp, that is, "wet" pulp is used, the reactions would be somewhat more efficient, and the consumption of chemicals would decrease by about 5 to 10%.

The cellulose can be oxidized selectively to a desired conversion degree which is not full conversion but a conversion where it can be mechanically processed as described later, without loss of material. The reached conversion in the end of the process (the above-mentioned one-step method or two-step method) is at least 0.9 mmol COOH/g pulp, preferably 0.9-1.4 mmol COOH/g pulp, most preferably 1.0-1.1 mmol COOH/g pulp.

The dosage of hypochlorite to cellulose, to reach the above-mentioned conversions, can be 2.7 to 3.5 mmol/g pulp, preferably about 3 mmol/g pulp.

The consistency of the pulp in the reaction medium where the oxidation is performed is preferably above 3%.

In all above-described embodiments the catalytic oxidation can be performed without the use of bromide. Sodium bromide, which is conventionally used as activator and cocatalyst because of the faster reaction rate and high degree of oxidation, can be avoided in the catalytic oxidation process according to still one embodiment. Conventionally, the optimum pH when sodium bromide is used is 10. However, side reactions occur at this pH which can not be avoided even at the relatively fast reaction rate. The DP value (degree of polymerization) will decrease considerably, which decreases the strength characteristics and gel forming ability of the NFC.

Thus, according to still one embodiment, the catalytic non-bromine oxidation with the heterocyclic nitroxyl radical as catalyst can be performed by using carefully defined conditions with regard to pH and temperature. The reaction is performed in neutral or slightly alkaline pH, in the range of 7-9, and at room temperature or slightly elevated temperature, in the range of 20-50° C., in the absence of alkali metal halide. The selectivity (less C2 ja C3 reactions) is improved, and bromine compounds are avoided. The slower oxidation reaction rate due to the lower pH is compensated by the temperature, which does not increase the side reactions as much as the higher pH. Chlorine oxide or any other activator can be used instead of alkali metal halide in the first step of catalytic oxidation with the hypochlorite as main oxidant using the above pH and temperature conditions. The second step of completing the oxidation is not necessarily needed, but if the residual aldehyde groups are to be oxidized to carboxyl groups, it is preferably performed by using chlorite as oxidant and protective substances for preventing unwanted side reactions in the second step, as explained above.

For the purpose of making NFC, it has been found that the oxidation level (conversion degree) of 0.5-1.0 mmol COOH/g pulp, preferably 0.6-0.95 and most preferably 0.7-0.9 is already sufficient that the cellulose fibers can be easily disintegrated to fibrils by mechanical energy. To reach this level, the one step oxidation process (only the first step of catalytic oxidation) is usually sufficient. However its is also possible to complete the oxidation in the second step by oxidizing the residual aldehydes to carboxyl groups to obtain cellulose with the above-mentioned oxidation levels indicated as COOH/g pulp. It is also advantageous to perform the catalytic oxidation at a high consistency of the pulp to be oxidized, which is higher than 4%, and preferably higher than 5.5%. The consistency of higher than 8% can even be used. Tests have been performed at the pulp consistency of 10%. When higher consistency is used, the selectivity of the cellulose oxidation can be further improved, because the desired reactions take place in the fiber, whereas the unwanted side reactions take place in the solution phase. At these starting pulp consistencies higher than 4%, the cellulose can be oxidized to the above-mentioned oxidation levels of 0.5-1.0 mmol COOH/g pulp, preferably 0.6-0.95 and most preferably 0.7-0.9, either in the one step oxidation process or using the second step to complete the oxidation. Further, any other oxidation levels mentioned in this disclosure can be obtained at these higher starting pulp consistencies of above 4%, either in the one-step oxidation process or using the second step after the first step.

At the above relatively low oxidation levels of 0.5-1.0 mmol COOH/g pulp, preferably 0.6-0.95 and most preferably 0.7-0.9, it is possible to obtain a stronger gel, when the fibers are disintegrated to fibrils, because there is less β-elimination. Thus, a lower degree of oxidation lowers the expenses on chemicals and helps to make a product of improved strength.

The fibrous starting material, which can be pulp of plant origin, especially wood (softwood or hardwood pulp, for example bleached birch pulp) and where the cellulose molecules are oxidized in one of the above-described methods, is easy to disintegrate to nanofibrillar size, nanofibrillar cellulose or NFC.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 μm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of the oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer.

The NFC prepared from cellulose raw material oxidized with the methods above has excellent gelling ability, which means that it forms a gel at a low consistency in aqueous medium. When the oxidized pulp is ground at a consistency of about 1 to 4% in aqueous medium, a clear gel consisting of microfibrils in water (NFC gel) is obtained.

In any of the preceding oxidation processes, the carboxylate content of 0.9-1.2 mmol COOH/g starting pulp (on dry matter), preferably 1.0-1.1 mmol COOH/g pulp is desirable so that the gel formation as a result of mechanical disintegration would be easy.

Before the oxidized pulp is disintegrated to make the NFC, the pH of the medium is adjusted to 7-10, preferably 7-9, and most preferably to 7-8.5, which lowers the energy needed.

The obtained NFC gel is characterized by shear thinning behaviour. The mean diameter of the microfibrils is 3-15 nm, or 5-15 nm, and the mean length is in the range of 0.5 to 2 μm. The turbidity is below 70, preferably 20 to 60 NTU (0.1% concentration, nephelometric measurement). Measured at a 0.5% concentration in water, the gel has zero shear viscosity of 5000-50000 Pa·s and yield stress of 8-40 Pa, preferably 10-30 Pa.

Some characteristic values of NFC grades where the cellulose has been oxidized to a relatively high oxidation level are given in the table below.

| Grade | Subgrade | Brookfield viscosity/mPas (0.8%) | Turbidity/ NTU | Charge/μeq/ g (conductometric titration) | Yield Stress Pa (0.5%) |
|---|---|---|---|---|---|
| | Anionic medium | 15000-30000 | 20-70 (20-60) | −900-1200 −1000-1100 | 10-30 11-20 |
| | Anionic premium | 30000-60 000 | <20 (<15) | −900-1200 −1000-1100 | 10-30 11-20 |

In the following some experiments are described which shall not be regarded as limiting.

First Embodiment

Tertiary Amine Activation

Results

Birch pulp was used in oxidation experiments. Reaction rate was followed by active chlorine titration and oxidation was ready when all NaClO was consumed. The selected pH level as maintained by NaOH, which was added by portions during oxidations. TEMPO oxidation with NaBr (pulp 10) represents the conventional oxidation which is widely reported in literature. TEMPO oxidation with (N(CH$_3$)$_3$) (pulp 5), which is a linear tertiary amine, is slow and unselective. This amine probably fragments easily. The cyclic tertiary (quinuclidine, hexamethylenetetramine, DABCO) amine assisted TEMPO oxidations are more selective and reaction rate is higher compared the oxidation with (N(CH$_3$)$_3$) assisted TEMPO oxidation. The cyclic tertiary amines are more stable. pH 8.5 was optimal level when quinuclidine (pulp 36) was used as activator of TEMPO. Optimal temperature to amine assisted TEMPO oxidations is 35-50° C. according to these experiments. Low amine dosage/dosage by portions increase the selectivity of oxidation. The reaction rate is also slower when amine is added by portions. The addition of NaClO by portions increases the selectivity compared the addition of NaClO by one portion.

shown in Table 1. The first titration of pulp 36 was executed after dosage of NaClO as portions.

Figure 2:
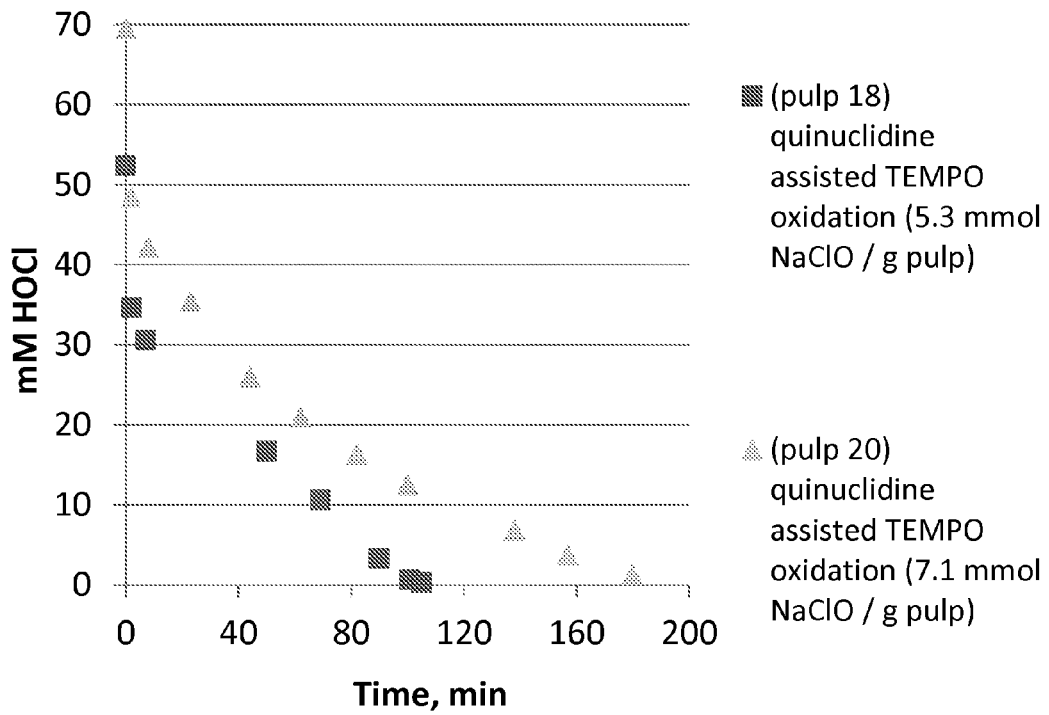

FIG. 2 shows the reaction rate as a function of NaClO dosage. The reaction time increased 50% when NaClO addition was increased 34%.

Second Embodiment

Chlorine Dioxide Activation

Materials:

Bleached birch pulp, TEMPO (Aldrich), ClO$_2$ water solution (prepared in lab), 3.5% NaClO solution (VWR), NaClO$_2$, 1 M NaOH, 1 M HCl, Büchi reactor (volume 1.6 dm$^3$), Metrohm 718 Stat Titrino titrator (pH adjustment), Metrohm 751 GPD Titrino titrator (conductometric titration), Tiamo 1.2.1. software (conductometric titration), Shimadzu 2550 UV-Vis spectrophotometer and UVProbe 2.32 software.

Oxidation of Bleached Birch Pulp:

TEMPO was mixed with ClO$_2$ water solution in a closed vessel. Despite low water solubility, TEMPO was dissolving to the solution (color change from red to black) while radical TEMPO was converting to oxidized form. The pulp was mixed with water (pulp consistency 1-4%) and transferred to Büchi reactor (mixing, temperature 25-50° C., volume of pulp solution 1-1.2 dm$^3$). The activated TEMPO solution and NaClO was added to the Büchi reactor. pH was adjusted to 8 by 1 M NaOH and automatic titrator after rapid pH decrease at the beginning of the oxidation. The oxidation rate was investigated by active chlorine titration until all HOCl was consumed. The pulp was washed through wire cloth. Carboxylate content (conductometric titration) and CED-viscosity (SCAN-CM 15:99) was analyzed from washed pulp samples.

Conversion of Residual Aldehydes to Carboxylates by Acid Phase:

The pulp suspension (1-4% pulp consistency) after washing or subsequently without washing was adjusted to pH 2 by

TABLE 1

The selected oxidation experiments by amine activated TEMPO as catalyst. Birch pulp without chemical oxidation was used as reference pulp (0.06 mmol COOH/g pulp). All experiments were executed in 1% pulp consistency, 0.8 mM TEMPO, 1000 ml volume. Amine additions 0.8 mM, except pulps 26, 31 (1.1 mM), pulp 36 (0.55 mM). Amine was added at the beginning of the oxidation in all experiments, expect pulps 26, 31, 36 were amine was added slowly by pump during oxidation. NaClO addition was executed in one fraction at the beginning of the oxidation, expect pulp 36 (NaClO added as portions during oxidations).

| | | Pulp | | | | | | |
|---|---|---|---|---|---|---|---|---|
| | | pH | T (° C.) | reaction time (h) | mmol COOH/ g pulp | mmol NaClO/ g pulp | mmol COOH/ mmol NaClO | viscosity (ml/g) |
| | Reference | | | | 0.06 | | | 748 |
| pulp 10 | Tempo oxidation (NaBr) | 10 | 25 | 2.5 | 1.28 | 5.2 | 0.25 | 174 |
| pulp 5 | Tempo oxidation (N(CH3)3) | 10 | 25 | 25 | 0.19 | 5.2 | 0.04 | 261 |
| pulp 17 | Tempo oxidation Quinuclidine | 9 | 35 | 5 | 1.23 | 7.1 | 0.17 | 120 |
| pulp 18 | Tempo oxidation Quinuclidine | 8 | 50 | 2 | 0.93 | 5.3 | 0.18 | 125 |
| pulp 20 | Tempo oxidation Quinuclidine | 8 | 50 | 3 | 1.04 | 7.1 | 0.15 | 104 |
| pulp 22 | Tempo oxidation Hexamethylenetetramine | 9 | 35 | 4 | 0.91 | 7.1 | 0.13 | 161 |
| pulp 26 | Tempo oxidation Hexamethylenetetramine | 9 | 50 | 4 | 1.11 | 7.1 | 0.16 | 134 |
| pulp 31 | Tempo oxidation DABCO | 9 | 50 | 3.5 | 1.03 | 7.1 | 0.14 | 122 |
| pulp 36 | Tempo oxidation Quinuclidine | 8.5 | 50 | 2.5 | 1.00 | 4.4 | 0.23 | 194 |

The reaction rates of amine assisted TEMPO oxidations are equal to bromine assisted TEMPO oxidation if higher reaction temperature is used. The used pH area of amine assisted TEMPO oxidation is always lower compared to bromine assisted TEMPO oxidation.

FIG. 1 shows the reaction rates of oxidations assisted by cyclic tertiary amines and NaBr. The reaction parameters are 1 M HCl. 1 mM NaClO$_2$ was added to the solution and conversion was executed in Büchi reactor (2-3 hours, 25-50° C.). The washing and analyzing of pulp was done by same procedure described above (oxidation of bleached pulp).

Results

The radical form of TEMPO is reacting rapidly with chlorine dioxide in room temperature. The yellow color of chlorine dioxide disappears immediately when chlorine dioxide and TEMPO solutions are mixed.

Figure 3:
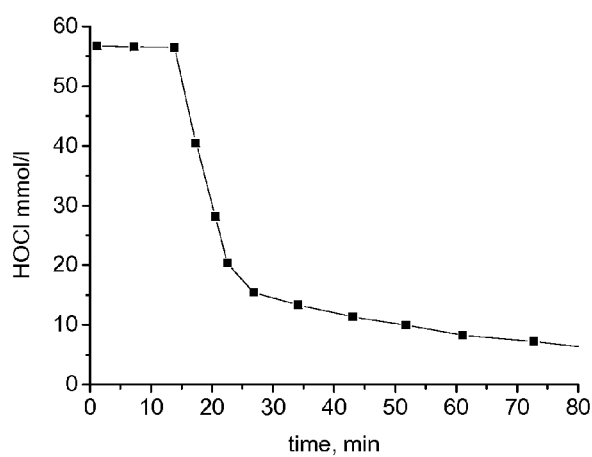

Radical TEMPO must be converted to oxidized form before the oxidation reaction between primary alcohol and HOCl takes place. NaBr or ClO2 can be used as activator of TEMPO. The activation of TEMPO was studied by model compound test (FIG. 3.). Oxidation stars rapidly after $ClO_2$ addition.

FIG. 3 shows the oxidation test by model compound. 50 mM n-propanol (excess amount), 59 mM NaClO, 1.3 mM $ClO_2$ (17 min delay), 0.8 mM TEMPO, pH 10, 25° C.

The reaction rate of TEMPO oxidation can be followed by active chlorine titration, which can be analyzed quickly from pulp solution during oxidation. The HOCl consumption rate is very low if NaBr or $ClO_2$ (activators of radical TEMPO) is not present. The further acid phase is executed immediately after total consumption of HOCl (detected by active chlorine titration). The optimal pH for oxidation made by $ClO_2$ activated TEMPO is 8. Reaction rate is higher compared to the corresponding oxidations at pH 9 and pH 7.

Figure 4:
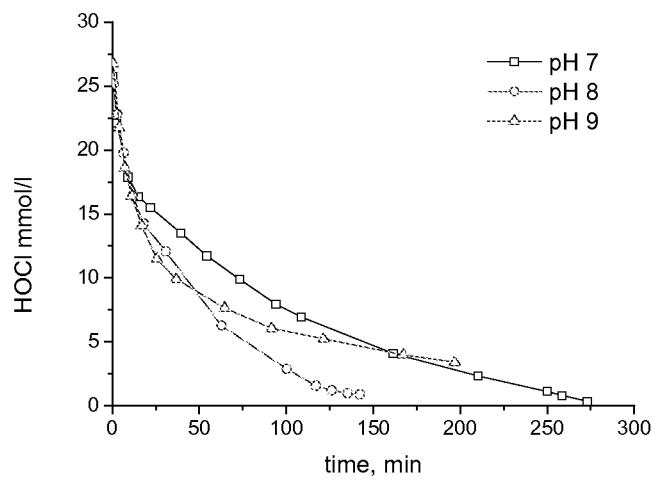

FIG. 4 shows the oxidation kinetics of birch pulp samples. 30 mM NaClO, 10 g pulp/dm$^3$, 1.1 mM ClO2, 0.8 mM TEMPO.

The selectivity of oxidation can be approximated by value mmol measured COOH/mmol consumed NaClO. CED-viscosity is an approximate meter of pulp quality after oxidation. High viscosity and high carboxylate content is a desired combination in many applications when using NFC as reinforcing additive. Highest viscosity and selectivity was reached at pH 8. The oxidized pulp can be disintegrated to transparent form after oxidation procedure by reasonable energy consumption.

TABLE 2

The carboxylate contents and CED-viscosities of oxidized pulp samples as a function of pH. Residual aldehydes were converted to carboxylates after oxidation by ClO2 activated TEMPO.

|  | mmol COOH/ g pulp | mmol NaClO/ g pulp | mmol COOH/ mmol NaClO | viscosity (ml/g) |
|---|---|---|---|---|
| pH 9 | 0.98 | 3 | 0.33 | 365 |
| pH 8 | 0.99 | 3 | 0.33 | 462 |
| pH 7 | 0.90 | 3 | 0.30 | 416 |

The reaction rate is fast after addition of chemicals to the reactor. Reaction rate decelerates when HOCl concentration decreases and the amount of sterically most available C6 hydroxyl groups decreases. Also selectivity decreases as a function of NaClO dosage. The consumption of NaClO (mmol measured COOH/mmol consumed NaClO) increases if high carboxylate content is desired.

Figure 5:
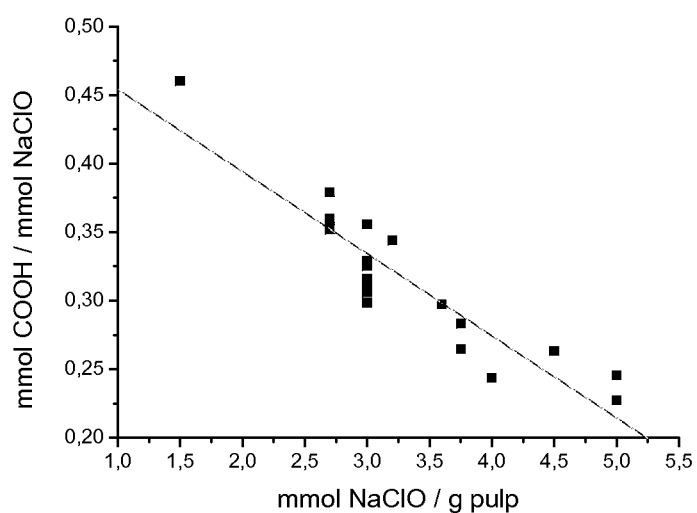

FIG. 5 shows the carboxylate content after acid phase (mmol COOH/mmol NaClO) as a function of NaClO dosage (mmol NaClO/g pulp). The oxidation conditions are shown in supplementary material.

The selectivity of $ClO_2$/TEMPO catalyzed oxidation increases as a function of pulp consistency. The chemical concentrations are also higher if oxidation is executed at higher pulp consistency. The rates of aldehyde and carboxylate formation are high immediately after NaClO addition. Furthermore, the selectivity is also highest at the beginning of oxidation. There is a correlation between carboxylate contents of NaClO/$ClO_2$ activated TEMPO oxidation (1-phase) and conversion of residual aldehydes to carboxylates by acid phase (2-phase). The residual aldehyde content is typically between 0.1-0.2 mmol CHO/g pulp. The aldehydes are converted to carboxylates by steady rate.

Figure 6:
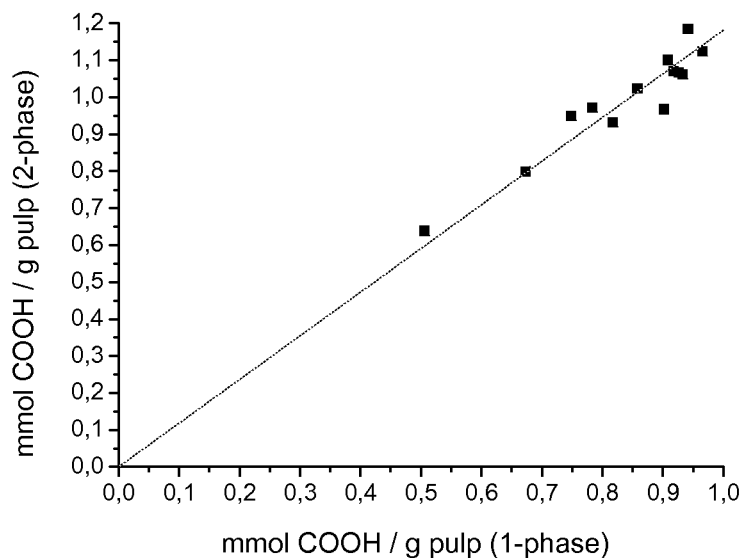

FIG. 6 shows the correlation of carboxylate contents (mmol COOH/g pulp) between oxidation phases (oxidation conditions in supplementary material).

There is a slight correlation of CED-viscosity contents between oxidation phases. The residual aldehydes are decreasing the measured CED-viscosity values originating the influence of the polysaccharide chain peeling by aldehyde groups in alkaline CED solution (pH 12). CED-viscosity values of 400-600 (ml/g) can be reached if carboxylate content is not exceeding the limit of 1 mmol COOH/g pulp. The optimal level of oxidation is an essential feature when producing high quality NFC.

Figure 7:
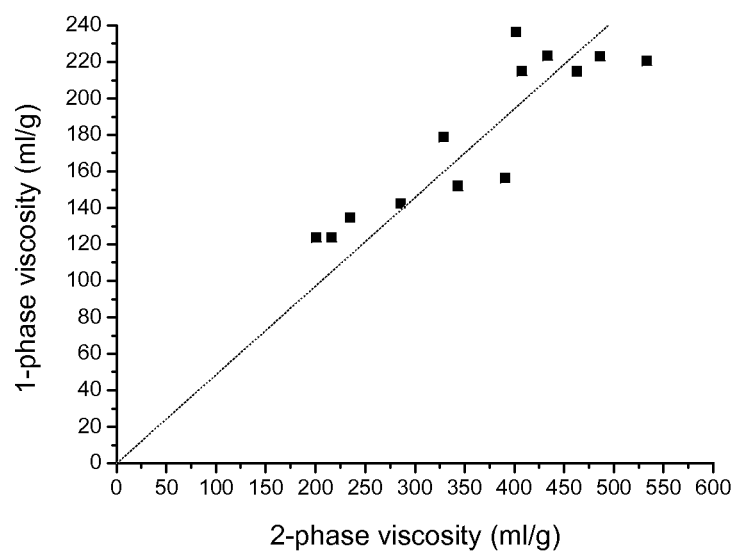

FIG. 7 shows the correlation of CED-viscosity contents (ml/g) between oxidation phases (oxidation conditions in supplementary material).

The aldehyde/carboxylate formation of the pilot scale oxidation was analyzed as a function of time. The formation of carboxylates from aldehydes takes place rapidly after aldehyde formation. The difference between carboxylates and aldehydes is lower compared the oxidation made by NaBr/TEMPO catalyzed oxidation. However, the difference is at the same level compared the laboratory oxidations.

Figure 8:
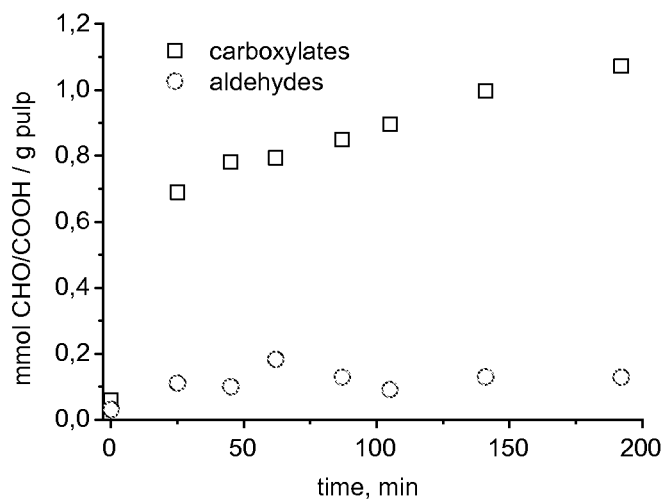

FIG. 8 shows the carboxylate and aldehyde contents of the pilot trial oxidation. NaClO dosage 3.6 mmol NaClO/g pulp, pH 8, temperature 35° C., 2.5 mM TEMPO, 3.8 mM $ClO_2$, pulp consistency 4%.

TABLE 3

The oxidation conditions by $ClO_2$ activated TEMPO and NaClO at pH 8. 1-phase denotes oxidation of pulp by ClO2 activated TEMPO and NaClO. 2-phase denotes conversion of residual aldehydes to carboxylates by $NaClO_2$ (acid phase).

| pulp | phase | T/ °C. | pulp consistency/ % | TEMPO/ mM | $ClO_2$/ mM | mmol COOH/ g pulp | mmol NaClO/ g pulp | mmol COOH/ mmol NaClO | CED-viscosity/ ml/g |
|---|---|---|---|---|---|---|---|---|---|
| 1 | 1-phase | 50 | 1 | 1.3 | 2.3 |  | 3 |  |  |
| 1 | 2-phase | 50 | 1 |  |  | 0.92 |  | 0.31 | 430 |
| 2 | 1-phase | 35 | 1 | 0.8 | 1.2 |  | 3 |  |  |
| 2 | 2-phase | 35 | 1 |  |  | 0.97 |  | 0.32 | 321 |
| 3 | 1-phase | 50 | 1 | 0.8 | 1.65 |  | 3 |  |  |
| 3 | 2-phase | 50 | 1 |  |  | 0.95 |  | 0.32 | 308 |
| 4 | 1-phase | 50 | 2 | 2 | 4.4 | 0.82 | 3 | 0.27 | 223 |
| 4 | 2-phase | 50 | 1 |  |  | 0.93 |  | 0.31 | 433 |
| 5 | 1-phase | 50 | 2.4 | 2 | 4.4 | 0.93 | 3.75 | 0.25 | 179 |
| 5 | 2-phase | 50 | 0.8 |  |  | 1.06 |  | 0.28 | 329 |
| 6 | 1-phase | 25 | 2 | 2 | 4.3 | 0.93 | 3 | 0.31 | 215 |
| 6 | 2-phase | 50 | 1 |  |  | 1.07 |  | 0.36 | 463 |

TABLE 3-continued

The oxidation conditions by ClO$_2$ activated TEMPO and NaClO at pH 8. 1-phase denotes oxidation of pulp by ClO2 activated TEMPO and NaClO. 2-phase denotes conversion of residual aldehydes to carboxylates by NaClO$_2$ (acid phase).

| pulp | phase | T/ °C. | pulp consistency/ % | TEMPO/ mM | ClO$_2$/ mM | mmol COOH/ g pulp | mmol NaClO/ g pulp | mmol COOH/ mmol NaClO | CED-viscosity/ ml/g |
|---|---|---|---|---|---|---|---|---|---|
| 7 | 1-phase | 25 | 3 | 2 | 4.3 | 0.51 | 1.5 | 0.34 | 236 |
| 7 | 2-phase | 50 | 1 | | | 0.64 | | 0.43 | 402 |
| 8 | 1-phase | 25 | 4 | 2 | 4.4 | 0.67 | 2.2 | 0.31 | 215 |
| 8 | 2-phase | 50 | 2.8 | | | 0.80 | | 0.36 | 408 |
| 9 | 1-phase | 25 | 4 | 2.5 | 5.6 | 0.86 | 2.7 | 0.32 | 223 |
| 9 | 2-phase | 25 | 4 | | | 1.02 | | 0.38 | 486 |
| 10 | 1-phase | 25 | 4 | 4.2 | 9.9 | 0.78 | 2.7 | 0.29 | 220 |
| 10 | 2-phase | 25 | 4 | | | 0.97 | | 0.36 | 533 |
| 11 | 1-phase | 25 | 4 | 2.5 | 5.6 | 0.90 | 2.7 | 0.33 | 156 |
| 11 | 2-phase | 25 | 4 | | | 0.97 | | 0.36 | 391 |
| 12 | 1-phase | 35 | 4 | 2 | 7.6 | 0.75 | 2.7 | 0.28 | 152 |
| 12 | 2-phase | 35 | 4 | | | 0.95 | | 0.35 | 343 |
| 13 | 1-phase | 35 | 4 | 2 | 7.1 | 0.91 | 3.2 | 0.28 | 142 |
| 13 | 2-phase | 35 | 4 | | | 1.10 | | 0.34 | 286 |
| 14 | 1-phase | 40 | 4 | 2 | 9.2 | 0.92 | 3.6 | 0.26 | 135 |
| 14 | 2-phase | 40 | 4 | | | 1.07 | | 0.30 | 235 |
| 15 | 1-phase | 35 | 4 | 2 | 7.8 | 0.94 | 4.5 | 0.21 | 124 |
| 15 | 2-phase | 35 | 4 | | | 1.19 | | 0.26 | 216 |
| 16 | 1-phase | 30 | 4 | 2 | 7.7 | 0.97 | 5 | 0.19 | 124 |
| 16 | 2-phase | 50 | 4 | | | 1.12 | | 0.22 | 201 |

Figure 9:
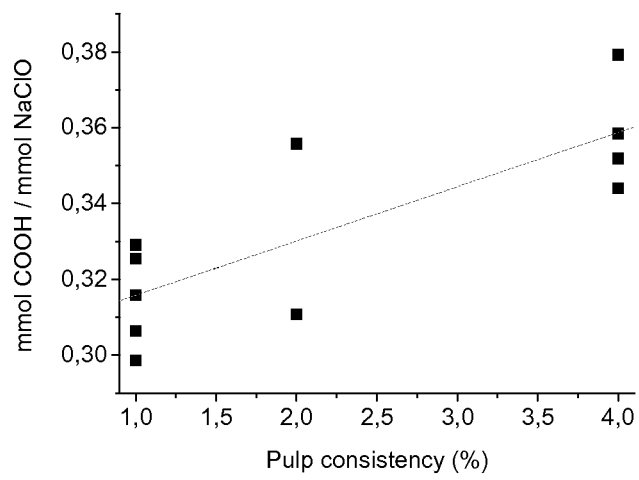

FIG. 9 shows the carboxylate formation (mmol COOH/mmol NaClO) as a function of pulp consistency (%). The oxidation conditions are shown in Table 3. The NaClO dosage of samples is between 2.7-3.2 mmol NaClO/g pulp.

Figure 10:
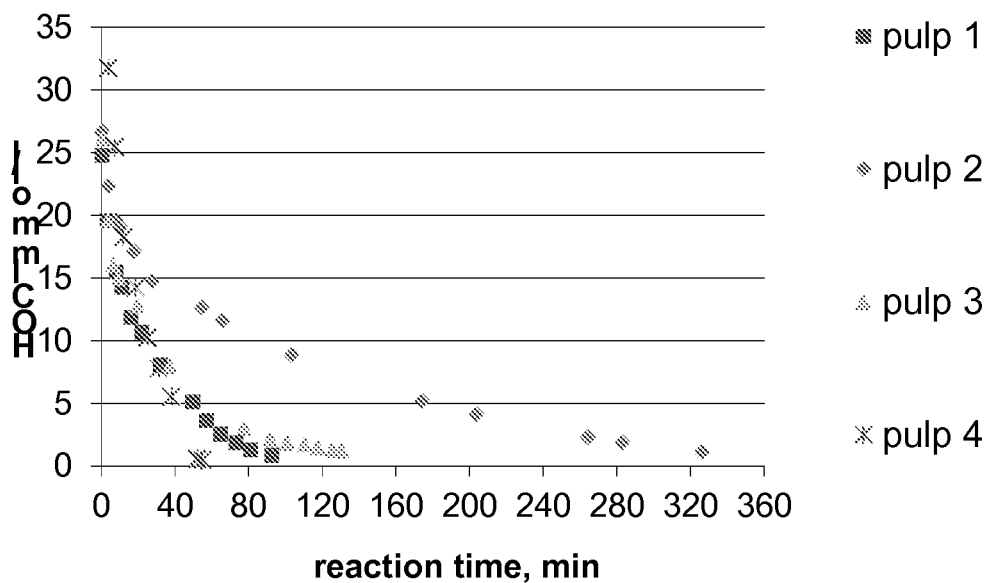
Figure 11:
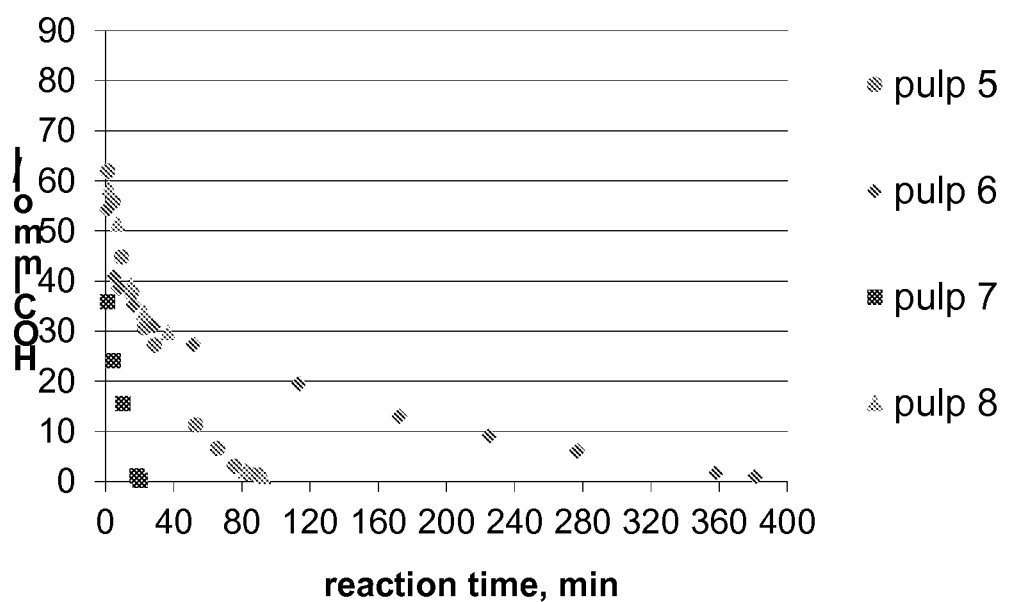
Figure 12:
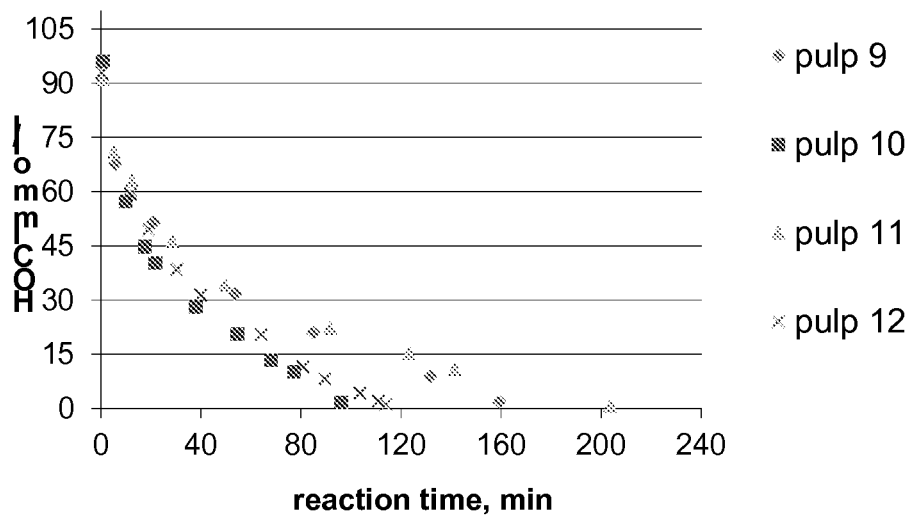
Figure 13:
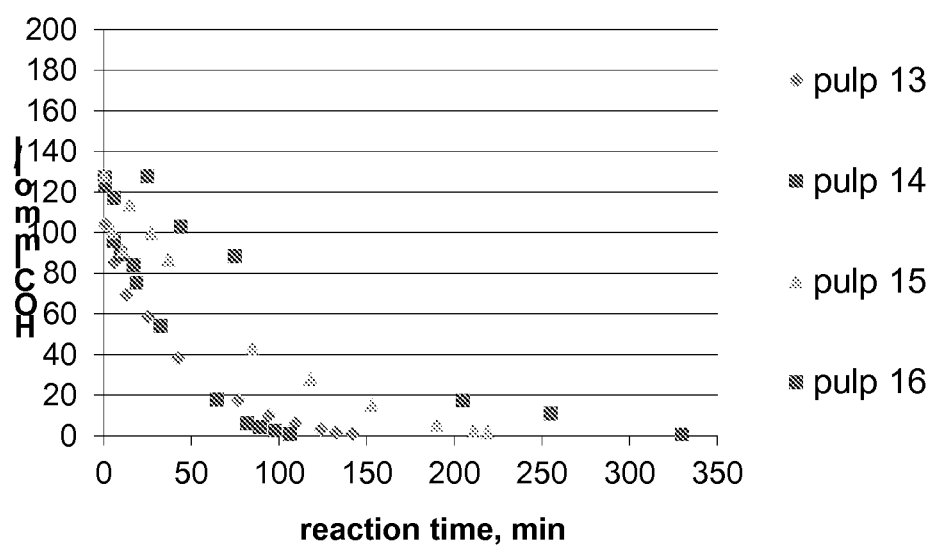

FIG. 10 shows the NaClO consumption of pulp samples 1-4 (1-phase), FIG. 11 the NaClO consumption of pulp samples 5-8 (1-phase), FIG. 12 the NaClO consumption of pulp samples 9-12 (1-phase), and FIG. 13 the NaClO consumption of pulp samples 13-16 (1-phase) where NaOCl was added by 2 fractions in sample pulp 16.

Third Embodiment

Protection in the Acid Phase

Following the catalytic oxidation in the first step, which is performed according to the second embodiment (activation of the catalyst by ClO$_2$ and oxidation by hypochlorite as main oxidant), the oxidation of the residual aldehydes by chlorite in the second step is performed using a protective substance which prevents the formation of hypochlorous acid.

The following is a general description of the two-step process that can be used in the third embodiment.

The first step (alkaline): TEMPO is dosed into a closed vessel, to which the aqueous chlorine dioxide solution is added. The chlorine dioxide activates the TEMPO to an oxidized form. This can be seen visually: the red TEMPO turns black and dissolves in the aqueous chlorine dioxide solution. The typical ClO$_2$/TEMPO molar ratio is 1.2. The concentration of chlorine dioxide and NaClO has been titrated on the same day as the oxidation is performed. Preheated water, cellulose and the chlorine dioxide/TEMPO solution are introduced in a reactor which has been thermostated to a desired temperature (25 to 50° C.). The pulp is mixed all the time during the oxidation. The pH of the pulp is adjusted with sodium hydroxide to a level of 6 to 7. NaClO is dosed in a controlled manner by pumping. The pH is maintained in the range of 7.8 to 8 with NaClO. NaOH can used already in this step as an auxiliary chemical for pH regulation. The aim is to maintain the content of NaClO constantly at a level below 10% during the oxidation, compared with the total dosage (typical dosage of NaClO is 2.3 mmol of NaClO per g of pulp). NaClO is easily decomposed if the pH changes abruptly and the NaClO content is simultaneously high. After all the NaClO has been slowly introduced in the reactor, the pH regulation step is started with NaOH. The pH is maintained in the range of 7.8 to 8 until it can be detected by active chlorine titration that the HOCl has been depleted. The oxidation can be followed also by means of color or Cl$_2$O$_2$ emissions. The pulp is washed with water, or alternatively, the oxidation in step 2 is started immediately.

The second step (acid): The washed pulp or pulp suspension directly from the first step is introduced in a reactor. The consistency is adjusted with preheated water to a desired level. A typical reactor temperature is 50° C. NaClO$_2$ and DMSO are input in the reactor. A typical dosage of NaClO$_2$ is 0.2 mmol of NaClO$_2$ per g of pulp. The typical DMSO/NaClO$_2$ molar ratio is 1 to 3; the pH is adjusted with sulphuric acid to the level of 3. The pulp is allowed to react for 15 min to 2 hours under mixing. The fastest reaction takes place at the beginning, the rest of the time is taken by the reaction of aldehydes which are oxidized more slowly. After the oxidation, the pulp is washed; if necessary, the filtrate can be recycled. In an industrial process, the ratio of DMSO to NaClO$_2$ is minimized, at it can be 1-2.5.

Figure 14:
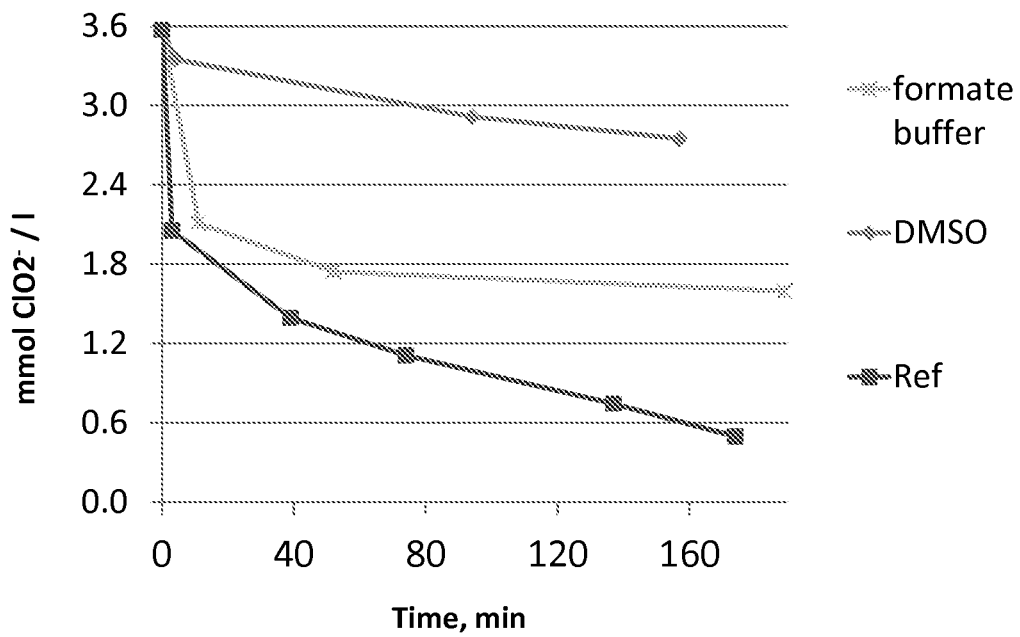

FIG. 14 shows the consumption of chlorite as a function of time in oxidations of the acidic second step. In reference oxidation (Ref) no protective chemical has been used. In formate buffer oxidation, a formate buffer has been used as a chemical protecting from hypochlorous acid. In the DMSO sample, dimethyl sulfoxide has been used as a chemical protecting from hypochlorous acid. In all the oxidations, the conditions were as follows: pH 3, 50° C., consistency 0.7%, birch pulp, oxidation time 3 h, volume 1400 ml, 0.5 mmol NaClO$_2$ per g of pulp. 50 ml of 1.0 M formate buffer was added to the sample. 2.1 mmol of DMSO per g of pulp was added to the DMSO sample.

The following table presents results from 2-step oxidation tests according to a third embodiment. It can be seen from the results that also other heterocyclic nitroxyl radicals than TEMPO can be used as a catalyst in the first step. In addition to the TEMPO catalyst, also two derivatives: 4-methoxy-TEMPO and 4-acetamido-TEMPO were used in the tests.

TABLE 4

Tabulated 2-step oxidations. The first oxidation step was performed with TEMPO or a TEMPO derivative, activated with chlorine dioxide, at pH 8 conditions. The second oxidation step was performed for the pulp oxidized in the first step with chlorite at pH 3, 50° C. conditions, by using DMSO as a protective substance. For calculating the DP, the formula of van Heiningen was used (da Silva Perez, D.; van Heiningen, A. R. P. Determination of cellulose degree of polymerization in chemical pulps by viscosimetry. In Proceedings of Seventh European Workshop on Lignocellulosics and Pulp, 2002; 393-396). Temperature indicated at the bottom of the table is the starting temperature of the 1st oxidation step.

| Experiment | pulp 132 | pulp 139 | pulp 140 | pulp 141 | pulp 142 | pulp 143 | pulp 144 | pulp 149 | pulp 150 | pulp 151 |
|---|---|---|---|---|---|---|---|---|---|---|
| TEMPO derivative | A | B | B | C | C | C | C | C | C | A |
| Reaction time (min) | 150 | 240 | 100 | 255 | 150 | 220 | 210 | 360 | 360 | 180 |
| HOCl addition (mmol NaClO/g pulp) | 2.3 | 2.3 | 2.3 | 2.3 | 2.3 | 2.3 | 2.3 | 2.3 | 2.3 | 2.3 |
| TEMPO addition (mmol/g pulp) | 0.05 | 0.05 | 0.05 | 0.05 | 0.075 | 0.05 | 0.05 | 0.04 | 0.025 | 0.05 |
| Molar ratio TEMPO/$ClO_2$ | 1.9 | 1.9 | 1.9 | 1.4 | 1.2 | 1.2 | 1.27 | 1.33 | 1.27 | 1.27 |
| mmol/g pulp (1 phase oxidation) | 0.76 | 0.78 | 0.75 | 0.68 | 0.59 | 0.65 | 0.68 | 0.78 | 0.70 | 0.80 |
| mmol/g pulp (2 phase oxidation) | 0.91 | 0.94 | 0.84 | 0.79 | 0.74 | 0.78 | 0.79 | 0.91 | 0.82 | 0.93 |
| DP (1 phase oxidation) | 639 | 526 | 510 | 504 | 508 | 527 | 517 | 497 | 490 | 510 |
| DP (2 phase oxidation) | 1683 | 1044 | 1023 | 824 | 969 | 911 | 1201 | 1384 | 1402 | 1776 |
| Selectivity after 2 phase (mmol COOH/mmol NaClO) | 0.36 | 0.37 | 0.35 | 0.32 | 0.29 | 0.31 | 0.31 | 0.37 | 0.33 | 0.38 |
| Temperature (° C.) | 25 | 25 | 35 | 25 | 25 | 35 | 35 | 25 | 25 | 25 |

| | |
|---|---|
| TEMPO | A |
| 4-methoxy-TEMPO | B |
| 4-acetamido-TEMPO | C |

As the results indicate, the cellulose from the 1st oxidation step degrades during the viscosity measurement (determination of the DP), whereas the cellulose is clearly stabilized by the second oxidation step (higher DP). It can be also deduced form the results, that two-step oxidation works in the same way irrespective of the use of the protective substance (DMSO etc.). The protective substance decreases clearly the consumption of the oxidant, though.

Figure 15:
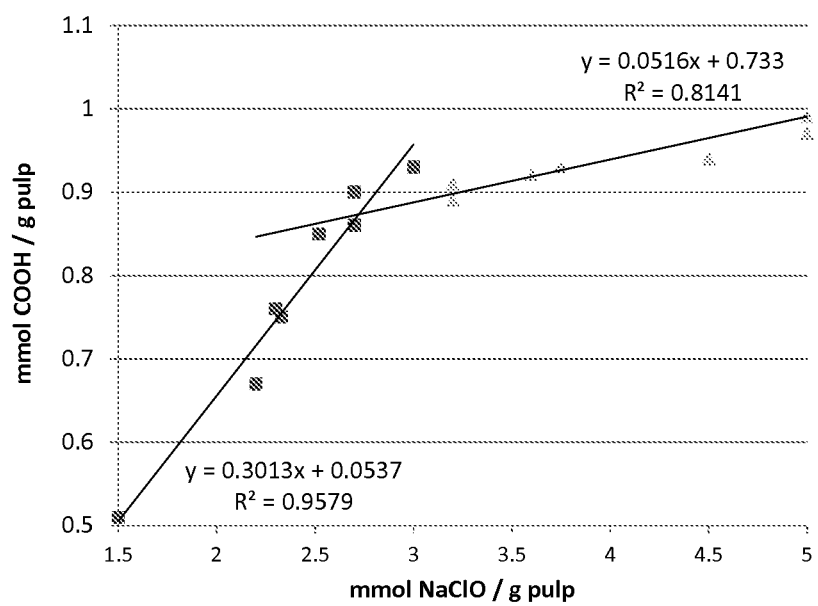

FIG. 15 shows the acid content of oxidations carried out with TEMPO activated by chlorine dioxide (mmol COOH per g of pulp) as a function of hypochlorite dosage in step 1. The Figure shows that up to the oxidation level of 0.9 mmol/g pulp the 1-step method is efficient as to the consumption of the main oxidant, hypochlorite.

The following table presents fibrillation results on pulp samples oxidized to different oxidation degrees, obtained with a device which subjects the pulp to impacts from opposite directions at a high frequency, called "Atrex". The used device was model G30, diameter of the device was 500 mm and it consisted of 6 concentric cylindrical rotors with through flow passages formed by spaced impact blades. The adjacent rotors rotated in opposite directions at 1500 rpm.

TABLE 5

Fibril pulps oxidized and fibrillated to different carboxylate levels. Bolded 0.76 oxidation level sample is 2-step sample oxidized further from the sample 0.63, whereas the others were obtained after the first step. Pulp passes refers to the times of passing the same sample through the device.

| COOH mmol/g | pulp passes | Brookfield | NTU |
|---|---|---|---|
| 0.63 | 2 | 3200 | 91 |
| 0.63 | 4 | 4800 | 59 |
| 0.74 | 2 | 10300 | 44 |
| 0.74 | 4 | 26200 | 28 |
| 0.76 | 2 | 9700 | 54 |
| 0.76 | 4 | 37500 | 33 |
| 0.95 | 2 | 17000 | 24 |
| 0.95 | 4 | 26600 | 19 |
| 1.03 | 2 | 16500 | 20 |
| 1.03 | 4 | 19700 | 15 |

From the results of Table 5, it can be seen that oxidation considerably improves fibrillation (higher Brookfield viscosity and lower turbidity NTU). Furthermore, the sample oxidized in two steps gives the highest viscosity value, which is due to the fact that non-degraded fibres are stronger.

Fourth Embodiment

Catalytic Oxidation in the Absence of Alkali Metal Halide at Neutral or Slightly Alkaline pH The first step of catalytic oxidation using the heterocyclic nitroxyl radical as catalyst and hypochlorite as main oxidant is performed in the pH range of 7-9, and in the temperature range of 20-50° C., in the absence of alkali metal halide, which is replaced by another activator, such as chlorine dioxide. In the second step the residual aldehyde groups are oxidized to carboxyl groups at lower pH by chlorite, according to the procedure in the second embodiment, and preferably using the protective substances according to the third embodiment. This second step can also be omitted and the oxidation level (conversion degree to COOH) can be left lower than otherwise would be attainable if the oxidation were completed in the second step.

For example, the oxidation level 0.7 to 0.9 mmol COOH per g of pulp is sufficient and, on the other hand, optimal for manufacturing microfibril cellulose by the described method. Oxidation carried out with a heterocyclic nitroxyl radical is also effective at a higher consistency, even at medium consistency, and an increase in the reaction consistency has been found to have positive effects. Also, an advantageous method of dosing the chemicals will be described in the following.

Contrary to the most commonly presented reaction conditions, it has thus been found that the cellulose oxidation reaction can be carried out at slightly alkaline conditions at pH 7 to 9, preferably at pH 7.5 to 8.5 (with or without a buffer) without an auxiliary NaBr catalyst, by using only a heterocyclic nitroxyl radial (for example TEMPO or a derivative of it) and hypochlorite. The reaction is slightly slower, but the slower reaction can be compensated for by raising the tem perature. It is known that an increase in the temperature will increase the number of side reactions, but in this case, the reaction is carried out in a controlled manner at a lower pH without sodium bromide, wherein the disadvantages of the raised temperature are outweighed by the advantages. As a result, after the oxidation, the DP is >500 and after a possible second step (chlorite oxidation) even >1000, which is a significant improvement to a standard reaction. With the reaction, it is difficult to obtain very high oxidation levels, but at the same time we have found that already an oxidation level of 0.5 to 1.0 mmol of COOH per g of pulp (advantageously 0.6 to 0.95, most advantageously 0.7 to 0.9 mmol of COOH per g of pulp) is a sufficient oxidation level, wherein the pulp which has been labilized by oxidation can be degraded relatively easily into microfibrils. Previously, it has been generally assumed that oxidation with an auxiliary NaBr catalyst (NaBr cocatalyst) at a high pH level is necessary to achieve a sufficiently high oxidation level, advantageously 1.5 mmol of COOH per g of pulp.

Primarily, the procedure is the following: The commercially available TEMPO catalyst or another heterocyclic nitroxyl radial which is capable of catalytically oxidizing the primary alcohol in carbon C-6 in pulp, for example a TEMPO derivative, is stable in its radical form. In the following, any reference to the TEMPO catalyst will also apply to said other catalysts. The catalyst in radical form has to be activated to the oxidized form before the oxidation by means of the catalyst via an aldehyde to a carboxylic acid can take place. The Scheme 2 above shows how the TEMPO radical is activated by chlorine dioxide to an oxidized form. After this, the catalytic oxidation of the carbon C-6 in the pulp takes place by means of the active TEMPO. Hypochlorous acid (HOCl), which is in equilibrium with the hypochlorite (pKa 7.53), acts as a TEMPO activator, returning the reduced TEMPO back to the oxidized form. The NaClO chemical is consumed in the reaction, and the catalyst remains. In this reaction, no bromide or other alkaline metal halide, such as iodide, will be needed for activating the radical TEMPO or returning the TEMPO from the reduced form to the oxidized form. The chlorine dioxide activated TEMPO oxidation takes placed at an optimal pH of 8, whereas oxidation by TEMPO activated by NaBr takes place at a pH of 10. The TEMPO is activated by chlorine dioxide in advance, wherein it will be needed in a smaller quantity than bromide in NaBr/TEMPO oxidation, where the bromide supplied to the reactor will oxidize the TEMPO during the process.

In tests carried out with model substances, it has been found that pH 7 to 8 is considerably more selective for the oxidation of primary alcohols than pH 10, when NaBr/TEMPO oxidation is used. Table 6 shows the results of tests with model substances. The HOCl consumption ratio of secondary alcohol and primary alcohol describes precisely the non-selective feature of the reaction and, as a result, the probability of a β elimination reaction. The lower the ratio, the better the oxidation. Table 6 shows that pH 10 was nonselective, particularly at the end of the oxidation reaction. The forming of secondary hydroxyls leads to the β elimination reaction and thereby to the degradation of cellulose chains. The β elimination reaction is intensified as the pH increases, and applies also to aldehyde groups formed of the hydroxyl group of carbon C6. Consequently, less degradation of cellulose chains takes place at pH 8, compared with pH 10, due to the lesser formation of secondary hydroxyl groups and slower β elimination reaction during the oxidation.

TABLE 6

Results of NaBr/TEMPO oxidations with model substances. The hypochlorite consumption in TEMPO oxidations activated with NaBr was measured as a function of time. As model substances for hydroxyl groups of cellulose, n-propanol and 2-propanol were used. Initial reaction and final reaction stand for the momentary consumption ratio in the beginning and in the end of the test, respectively.

| pH | initial reaction HOCl consumption secondary alcohol/primary alcohol | final reaction HOCl consumption secondary alcohol/primary alcohol |
| --- | --- | --- |
| 7 | 0.10 | 0.02 |
| 8 | 0.04 | 0.02 |
| 9 | 0.06 | 0.10 |
| 10 | 0.12 | 0.25 |
| 11 | 0.09 | 0.02 |

Figure 16:
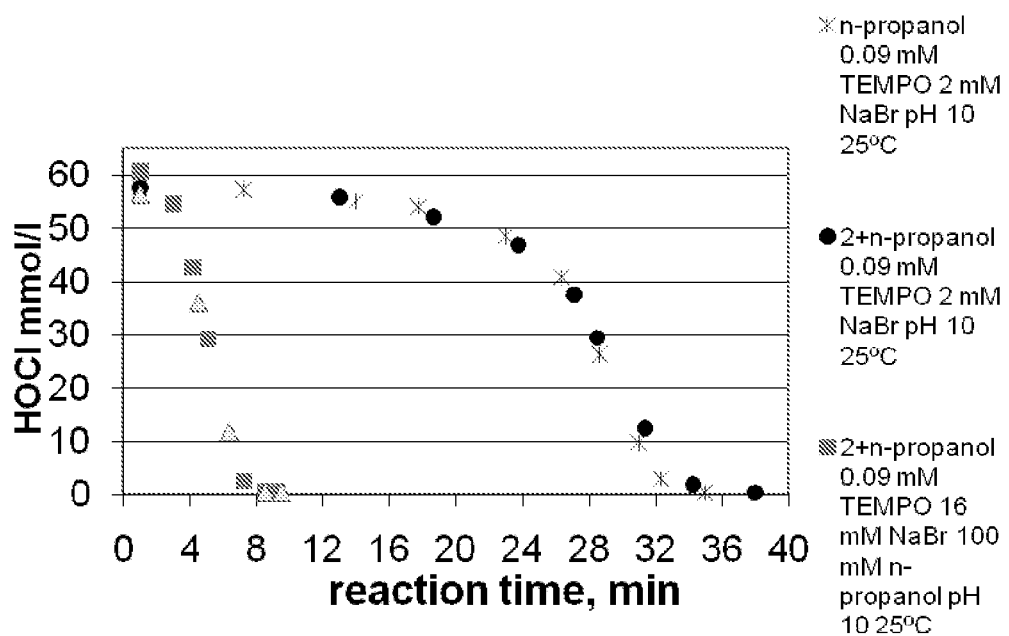

As stated above, the bromine compounds are harmful to human health. Residues of bromine compounds in the final product and their accumulation in washing waters cannot be prevented, if large quantities of sodium bromide are used. In typical NaBr/TEMPO oxidation, the quantity of NaBr is 12 mmol per g of pulp, which corresponds to 125 kg of NaBr per ton of pulp. FIG. 16 illustrates the demand of bromide for activation of TEMPO, which is due to the fact that NaBr is decomposed in the reaction and a bromine compound, which is yet unknown, is formed, which activates the TEMPO. Thus, it is believed that part of bromide is needed to initially activate TEMPO and that part can not be recovered.

As seen in FIG. 16, the time required for the activation of TEMPO is proportional to the dosage of NaBr. All the oxidation tests have been carried out at pH 10 at a temperature of 25° C. with n- and 2-propanol as the model substances. The HOCl content as a function of time shows that when the NaBr content increases from 2 mM to 16 mM, the total oxidation time is reduced to approximately one quarter. From the graphs it can be seen that TEMPO is activated clearly more slowly at lower NaBr contents, but the actual TEMPO oxidation reaction, in which HOBr functions as an activator, is fast in both cases.

Now, in the fourth embodiment of the method, TEMPO, its derivative, or another heterocyclic nitroxyl radical which oxidizes catalytically a primary alcohol group in carbon C-6 of cellulose, is activated not with sodium bromide but with chlorine dioxide or chlorine gas to accelerate the reaction. A typical dosage of chlorine dioxide to be used for activation of TEMPO is lower than 0.1 mmol of $ClO_2$ per g of pulp. Successful tests have been carried out even with dosages of 0.03 mmol of $ClO_2$ per g of pulp (tests of low TEMPO dosage). Chlorine dioxide is typically dosed in a quantity of 1.1 to 1.4 times the quantity of TEMPO (in molar ratio), to secure complete activation of the catalyst. Activation of TEMPO by chlorine dioxide in advance is considerably more efficient than activation of TEMPO by NaBr during oxidation, taking into account the consumption of the activating substance (for example, the test of FIG. 16 in which the molar quantity of NaBr is 20 times that of the catalyst, even with the lowest dosage).

In tests with model substances, it has been found that NaClO, the primary alcohol, TEMPO, and NaBr have to be present in the reactor before the activation of TEMPO. For chlorine dioxide, it is sufficient that aqueous chlorine dioxide and TEMPO are mixed. Consequently, the TEMPO, any derivative of TEMPO or any heterocyclic nitroxyl radical can be activated with chlorine dioxide in a small volume efficiently without side reactions before the actual oxidation, separately from the cellulose to be oxidized. Thus, the oxidation is started immediately when the activated TEMPO is admixed to the cellulose and the dosage of NaClO is started.

For the NaBr/TEMPO oxidation, one should also take into account the decomposition reaction of hypobromous acid (HOBr) used as an activator of the reduced TEMPO, when acting at a pH level higher than 9. As a result of the decomposition reaction, inactive bromate ($BrO_3^-$) is formed, which is cumulated in the mixture if the TEMPO catalyst is to be recycled. Degradation to bromate can also take place in a reaction with hypobromous acid and hypochlorite ($^-OCl$); the bromate is formed via an intermediate product (bromous acid, $HBrO_2$).

TEMPO, any derivative of TEMPO or any heterocyclic nitroxyl radical can be activated in liquid phase in aqueous chlorine dioxide solution, but a more efficient oxidation is achieved in gas phase, that is, the solid catalyst is in an air space where chlorine dioxide gas is introduced. The activation of the catalyst with chlorine dioxide gas is performed as separate operation before the activated catalyst is introduced to the actual reaction medium containing pulp and the catalytic oxidation of cellulose is the started catalytically with the main oxidant (hypochlorite). This separate gas phase activation can be used in all embodiments and variations of this disclosure where chlorine dioxide is used for the activation of TEMPO, any derivative of TEMPO or any heterocyclic nitroxyl radical capable of catalyzing selectively the oxidation of the hydroxyl groups of C-6 carbon in cellulose.

Figure 17:
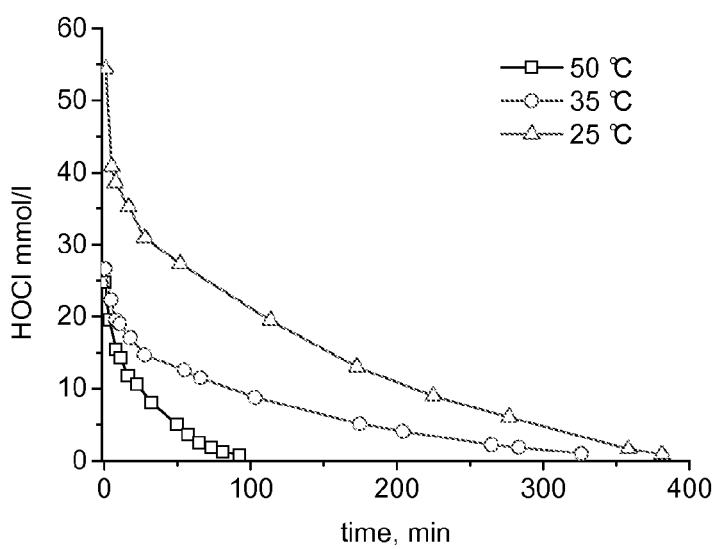

TEMPO oxidation activated by chlorine dioxide can be carried out at room temperature or at an elevated temperature (25 to 50° C.). The reaction time can be made shorter if the temperature is raised, as shown in FIG. 17. In a corresponding manner, the selectivity of the reaction is reduced as a function of the temperature (the consumption of NaClO increases), because hypochloric acid is degraded more as the temperature rises. FIG. 17 shows tests at a consistency of 1% (35, 50° C.) and 2% (25° C.). The concentrations of the TEMPO catalyst were 2 mM (25° C.), 0.8 mM (35° C.) and 1.3 mM (50° C.). At all the temperatures, the dosage of NaClO was 3 mmol per g of pulp, and the reached oxidation numbers (mmol of COOH per g of pulp) after step 2 (oxidation with chlorite at low pH) were 1.07 (25° C.), 0.97 (35° C.), 0.92 (50° C.). The data of FIG. 17 is also shown in Table 7 (pulp 53, pulp 54, pulp 58). In Table 7, results are compiled from different oxidation tests in which the TEMPO catalyst was activated with chlorine dioxide, the pulp consistencies varying from 0.8 to 4%.

The table shows the results measured after both the first oxidation phase (phase 1) and the subsequent second oxidation phase (2 phase). The conditions of the second oxidation phase ($2^{nd}$ step) were pH 2, 50° C., 1 mM $NaClO_2$, 1-4% pulp consistency, duration 2 hours.

TABLE 7

Oxidations activated with chlorine dioxide at various consistencies, at dosages of TEMPO, $ClO_2$ and NaClO. The DP varies between 500 and 1400 ($2^{nd}$ oxidation).

| pulp | phase | T/°C. | pulp consistency/% | TEMPO/mM | $ClO_2$/mM | mmol COOH/g pulp | mmol NaClO/g pulp | mmol COOH/mmol NaClO | CED-viscosity/ml/g |
|---|---|---|---|---|---|---|---|---|---|
| 53 | 1-phase | 50 | 1 | 1.3 | 2.3 | | 3 | | |
| 53 | 2-phase | 50 | 1 | | | 0.92 | | 0.31 | 430 |
| 54 | 1-phase | 35 | 1 | 0.8 | 1.2 | | 3 | | |
| 54 | 2-phase | 35 | 1 | | | 0.97 | | 0.32 | 321 |
| 55 | 1-phase | 50 | 1 | 0.8 | 1.65 | | 3 | | |
| 55 | 2-phase | 50 | 1 | | | 0.95 | | 0.32 | 308 |
| 56 | 1-phase | 50 | 2 | 2 | 4.4 | 0.82 | 3 | 0.27 | 223 |
| 56 | 2-phase | 50 | 1 | | | 0.93 | | 0.31 | 433 |
| 57 | 1-phase | 50 | 2.4 | 2 | 4.4 | 0.93 | 3.75 | 0.25 | 179 |
| 57 | 2-phase | 50 | 0.8 | | | 1.06 | | 0.28 | 329 |
| 58 | 1-phase | 25 | 2 | 2 | 4.3 | 0.93 | 3 | 0.31 | 215 |
| 58 | 2-phase | 50 | 1 | | | 1.07 | | 0.36 | 463 |
| 59 | 1-phase | 25 | 3 | 2 | 4.3 | 0.51 | 1.5 | 0.34 | 236 |
| 59 | 2-phase | 50 | 1 | | | 0.64 | | 0.43 | 402 |
| 60 | 1-phase | 25 | 4 | 2 | 4.4 | 0.67 | 2.2 | 0.31 | 215 |
| 60 | 2-phase | 50 | 2.8 | | | 0.80 | | 0.36 | 408 |
| 61 | 1-phase | 25 | 4 | 2.5 | 5.6 | 0.86 | 2.7 | 0.32 | 223 |
| 61 | 2-phase | 25 | 4 | | | 1.02 | | 0.38 | 486 |
| 62 | 1-phase | 25 | 4 | 4.2 | 9.9 | 0.78 | 2.7 | 0.29 | 220 |
| 62 | 2-phase | 25 | 4 | | | 0.97 | | 0.36 | 533 |
| 63 | 1-phase | 25 | 4 | 2.5 | 5.9 | 0.90 | 2.7 | 0.33 | 156 |
| 63 | 2-phase | 25 | 4 | | | 0.97 | | 0.36 | 391 |
| 64 | 1-phase | 35 | 4 | 2 | 7.6 | 0.75 | 2.7 | 0.28 | 152 |
| 64 | 2-phase | 35 | 4 | | | 0.95 | | 0.35 | 343 |
| 65 | 1-phase | 35 | 4 | 2 | 7.1 | 0.91 | 3.2 | 0.28 | 142 |
| 65 | 2-phase | 35 | 4 | | | 1.10 | | 0.34 | 286 |
| 66 | 1-phase | 40 | 4 | 2 | 9.2 | 0.92 | 3.6 | 0.26 | 135 |
| 66 | 2-phase | 40 | 4 | | | 1.07 | | 0.30 | 235 |
| 67 | 1-phase | 35 | 4 | 2 | 7.8 | 0.94 | 4.5 | 0.21 | 124 |
| 67 | 2-phase | 35 | 4 | | | 1.19 | | 0.26 | 216 |
| 68 | 1-phase | 30 | 4 | 2 | 7.7 | 0.97 | 5 | 0.19 | 124 |
| 68 | 2-phase | 50 | 4 | | | 1.12 | | 0.22 | 201 |

Corresponding DP values of Table 7: (pulp number- phase, DP): 53-2 1542; 54-2 1103; 55-2 1052; 56-1 734; 56-2 1546; 57-1 571; 57-2 1134; 58-1 703; 58-2 1664; 59-1 783; 59-2 1420; 60-1 703; 60-2 1444; 61-1 734; 61-2 1758; 62-1 724; 62-2 1949; 63-1 490; 63-2 1376; 64-1 475; 64-2 1191; 65-1 441; 65-2 968; 66-1 414; 66-2 777; 67-1 376; 67-2 708; 68-1 376; 68-2 652

Figure 18:
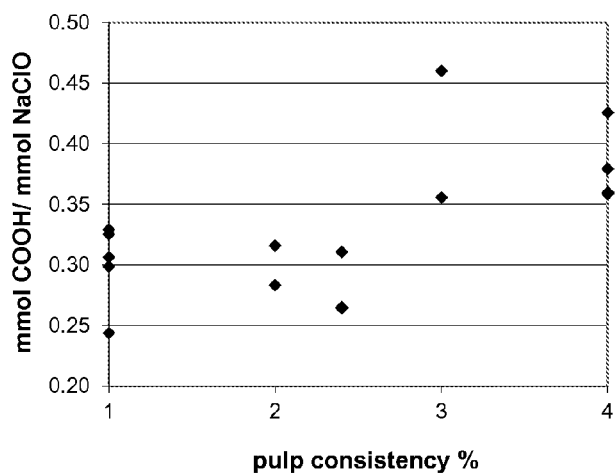

Most of the laboratory oxidations were carried out at the consistency of 4%. Some oxidations were carried out with MC mixer at the consistency of 10% and some with MC pulper at the consistency up to 11%. The oxidation at a high consistency is, in theory, more selective, because the desired reactions take place in the fibre and the undesired side reactions take place in the solution phase. In practice, it has been possible to reduce the amount of the TEMPO catalyst and the chlorine dioxide in relation to the fibre quantity dosed by increasing the consistency. In our tests, we did not find problems in carrying out oxidations with TEMPO at increased consistencies up to medium consistencies. Typical reactions given in the prior art are carried out at a consistency of 1%, and not higher than 4%. In the advantageous variant of this fourth embodiment, the consistency is higher than 4%, preferably higher than 5.5% and even higher than 8%. FIG. 18 shows the selectivity of the oxidation as function of consistency. The figure is based on the series of oxidations shown in Table 7. It can be seen from FIG. 18 that the selectivity of the oxidation (formed carboxylic acids per consumed hypochlorite) is improved when the consistency is increased.

Table 8 shows oxidation results at a consistency of 10% (MC mixer). During oxidation, a MC mixer does not provide mixing corresponding to mixing with a Buchi reactor (consistency 1 to 4%). Also the dosage of NaClO and the pH regulation are less accurate. Oxidation is good also at a consistency of 10%, and even better results can be obtained by using an apparatus with more accurate chemical dosage and pH regulation. Consequently, the results at medium consistency are preliminary but promising. Table 9 shows oxidations carried out with a Buchi reactor at a consistency of 4%. Also included are two TEMPO derivatives: 4-methoxy-TEMPO and 4-acetamido-TEMPO. On the basis of the tests, it can be said that chlorine dioxide can be used to activate not only TEMPO but also TEMPO derivatives. The dosage of TEMPO can also be decreased (pulp 149 to 150) so that the selectivity of the oxidation is maintained. What is essential in optimizing the dosage of the catalyst to a lower level is to optimize the feeding of NaClO/NaOH simultaneously during the oxidation.

TABLE 8

TEMPO oxidations activated with chlorine dioxide with a MC mixer at a consistency of 10%.

| Experiment | pulp 112 | pulp 113 | pulp 114 | pulp 115 | pulp 116 | pulp 117 | pulp 118 | pulp 120 |
|---|---|---|---|---|---|---|---|---|
| HOCl addition (mmol NaClO/g pulp) | 3.8 | 1.8 | 1.8 | 1.8 | 2.0 | 4.4 | 4.5 | 4.5 |
| TEMPO addition (mmol/g pulp) | 0.03 | 0.03 | 0.03 | 0.015 | 0.03 | 0.03 | 0.03 | 0.03 |
| Molar ratio $ClO_2$/TEMPO | 2.2 | 1.8 | 1.7 | 2.7 | 2.7 | 2.9 | 3.8 | 5.7 |
| mmol/g pulp (1 phase oxidation) | 0.82 | 0.55 | 0.55 | 0.48 | 0.55 | 1.11 | 1.07 | 0.95 |
| mmol/g pulp (2 phase oxidation) | | | 0.72 | 0.63 | 0.80 | 1.14 | 1.17 | 1.13 |
| Viscosity (ml/g) (1 phase oxidation) | 137 | 164 | 196 | 179 | 159 | 135 | 129 | 153 |
| Viscosity (ml/g) (2 phase oxidation) | | | 382 | 213 | 298 | 145 | 205 | 225 |
| Selectivity after 2 phase (mmol COOH/mmol NaClO) | | | | 0.31 | 0.34 | 0.25 | 0.25 | 0.23 |
| Temperature (° C.) | 25 | 25 | 25 | 25 | 25 | 25 | 25 | 25 |

TABLE 9

TEMPO oxidations activated with chlorine dioxide with a Buchi reactor at a consistency of 4%. The tests are the same as in Table 4.

| Experiment | pulp 132 | pulp 139 | pulp 140 | pulp 141 | pulp 142 | pulp 143 | pulp 144 | pulp 149 | pulp 150 |
|---|---|---|---|---|---|---|---|---|---|
| TEMPO derivative | A | B | B | C | C | C | C | C | C |
| Reaction time (min) | 150 | 240 | 100 | 255 | 150 | 220 | 210 | 360 | 360 |
| HOCl addition (mmol NaClO/g pulp) | 2.3 | 2.3 | 2.3 | 2.3 | 2.3 | 2.3 | 2.3 | 2.3 | 2.3 |
| TEMPO addition (mmol/g pulp) | 0.05 | 0.05 | 0.05 | 0.05 | 0.075 | 0.05 | 0.05 | 0.04 | 0.025 |
| Molar ratio TEMPO $ClO_2$ | 1.9 | 1.9 | 1.9 | 1.4 | 1.2 | 1.2 | 1.27 | 1.33 | 1.27 |
| mmol/g pulp (1 phase oxidation) | 0.76 | 0.78 | 0.75 | 0.68 | 0.59 | 0.65 | 0.68 | 0.78 | 0.70 |
| mmol/g pulp (2 phase oxidation) | 0.91 | 0.94 | 0.84 | 0.79 | 0.74 | 0.78 | 0.79 | 0.91 | 0.82 |
| Viscosity (ml/g) (1 phase oxidation) | 197 | 165 | 161 | 159 | 160 | 166 | 163 | | |
| Viscosity (ml/g) (2 phase oxidation) | 465 | 304 | 298 | 246 | 284 | 269 | 344 | | |
| Selectivity after 2 phase (mmol COOH/mmol NaClO) | 0.36 | 0.37 | 0.35 | 0.32 | 0.29 | 0.31 | 0.31 | 0.37 | 0.33 |
| Temperature (° C.) | 25 | 25 | 35 | 25 | 25 | 35 | 35 | 25 | 25 |

| TEMPO | A |
| 4-methoxy-TEMPO | B |
| 4-acetamido-TEMPO | C |

In still one test series, chlorine dioxide activated TEMPO oxidations were executed in MC pulper at pulp consistencies of 6-11%. Temperature (25-35° C.), pH (7-8) and NaClO addition were adjusted manually during oxidation. Most of the experiments were executed by 2.3 mmol NaClO/g pulp addition. The results are shown in the following table 10.

TABLE 10

MC pulper oxidations at high consistencies. Selectivity means the molar ratio COOH/hypochlorite. Part of the hypochlorite oxidizes OH-groups to aldehydes, but only ratio COOH-groups/consumed NaClO is shown.

| Experiment | 1 | 2 | 3 | 4 | 5 | 6 | 7 | 8 | 9 |
|---|---|---|---|---|---|---|---|---|---|
| Pulp consistency at start (%) | 11 | 10.1 | 10.7 | 6 | 6 | 7.8 | 7.8 | 6 | 10 |
| mmol TEMPO/g pulp | 0.03 | 0.02 | 0.04 | 0.03 | 0.04 | 0.04 | 0.025 | 0.04 | 0.04 |

TABLE 10-continued

MC pulper oxidations at high consistencies. Selectivity means the molar
ratio COOH/hypochlorite. Part of the hypochlorite oxidizes OH-groups
to aldehydes, but only ratio COOH-groups/consumed NaClO is shown.

| Experiment | 1 | 2 | 3 | 4 | 5 | 6 | 7 | 8 | 9 |
|---|---|---|---|---|---|---|---|---|---|
| mmol NaClO/g pulp dosage | 2.3 | 2.3 | 2.3 | 2.3 | 2.3 | 2.3 | 2.3 | 2.7 | 2.7 |
| mmol COOH/g pulp | 0.79 | 0.69 | 0.8 | 0.71 | 0.72 | 0.77 | 0.71 | 0.82 | 0.85 |
| selectivity NaClO/COOH | 0.34 | 0.30 | 0.35 | 0.31 | 0.31 | 0.33 | 0.31 | 0.30 | 0.32 |

Figure 19:
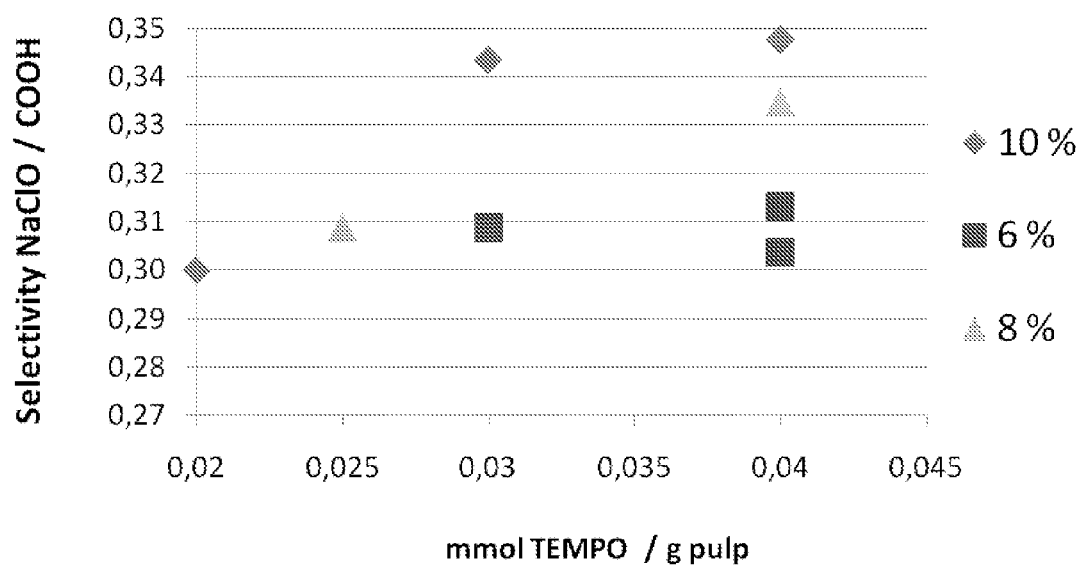

The selectivity of chlorine dioxide activated TEMPO oxidation as a function of TEMPO dosage and pulp consistency (6-10%) of the above experiments is shown also in FIG. 19, with consistency values rounded. The maximum selectivity value (formation of COOH groups/added NaClO) is 0.5 due the stoichiometry of reaction. 2 mol NaClO is consumed to formation of 1 mol COOH in cellulose because formation of COOH group from hydroxyl group goes via aldehyde intermediate.

According to these results is it obvious that higher pulp consistency increases the selectivity of chlorine dioxide activated TEMPO oxidation. The roughness of these experiments (manual pH and temperature control) does not interfere that phenomenon. The optimal conditions of oxidation according to these result is 10-11% pulp consistency and 0.03-0.04 mmol TEMPO/g pulp.

Figure 20:
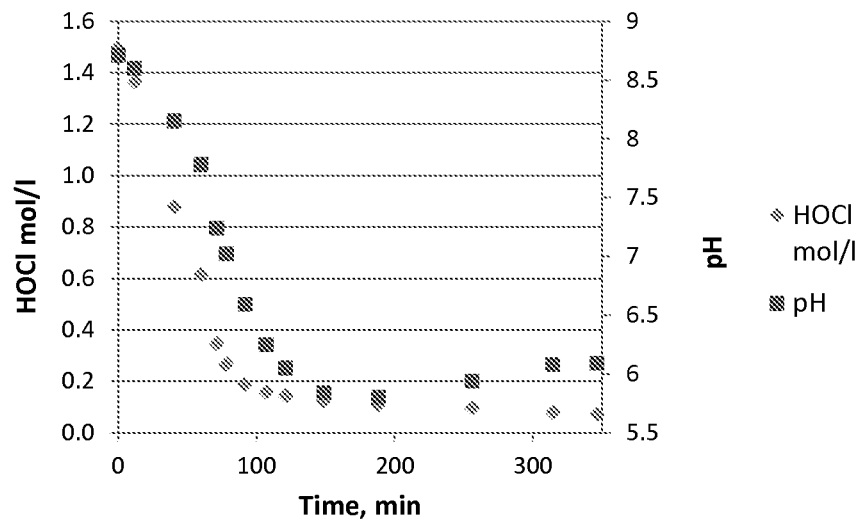
Figure 21:
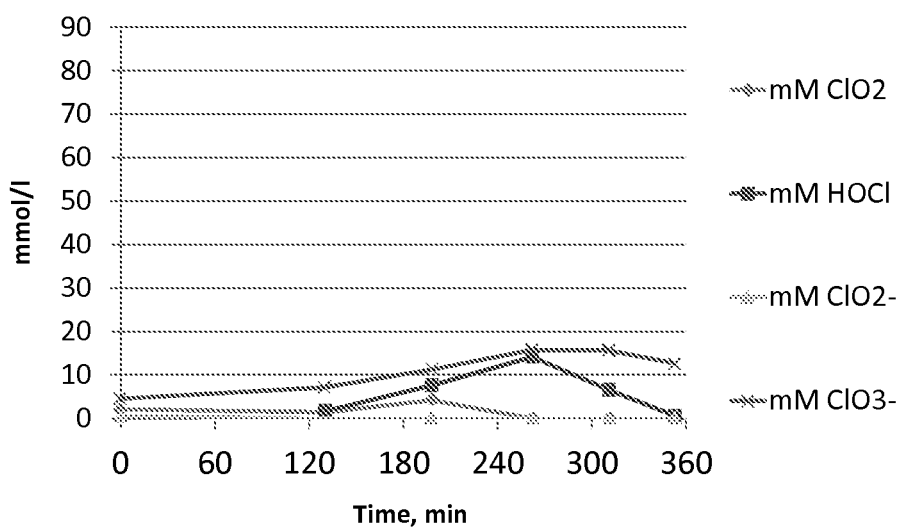

The selectivity of the oxidation can be improved by pumping NaClO at a low rate into the reactor during the oxidation. It has been found that the reaction rate does not depend on the concentration of HOCl in the reaction mixture but is constant when a sufficient quantity of hypochlorite is present in the reaction. The phenomenon behind the improved selectivity is the tendency of NaClO to decompose when the pH decreases. The decomposition of NaClO is stronger if the HOCl content in the solution is high during the oxidation. In a standard reaction, all the hypochlorite is added at a time. HOCl is decomposed into dichlorinemonoxide ($Cl_2O$) which is a volatile compound. Dichlorinemonoxide is decomposed further into chlorate ($ClO_3$) in a reaction with hypochlorite. FIG. 20 shows the decomposition of hypochlorous acid at room temperature without stirring after the pH had been adjusted lower down to the value 9 with sulphuric acid. The strong hypochlorite decomposed quickly into dichlorinemonoxide (boiling point 2° C.) within a few hours as the pH was decreased, and the solution was full of bubbles at the end of the reaction. FIG. 21 shows chlorine chemicals measured by active chlorine titration during oxidation of TEMPO activated with chlorine dioxide. The measurements were taken in the test "pulp 149" in Table 9. The feeding of hypochlorite was slow during the whole process, and NaOH was admixed simultaneously in order to neutralize the carboxylic acids produced. The total dosage of NaClO was 92 mmol/l during the oxidation. With NaOH it is also possible to return part of the formed $Cl_2O$ gas back to hypochlorite if the base is fed from above into the reactor during the oxidation (equilibrium $2HOCl(aq) \leftrightarrows Cl_2O(g)+H_2O(l)$). Hypochlorous acid is quickly returned to hypochlorite under alkaline conditions. In said oxidation, a high carboxylic acid content was achieve with a lowered catalyst content (4-acetamido-TEMPO 0.04 mmol/g pulp; 0.78 mmol COOH/g pulp after step 1).

Instead of chlorine dioxide, chlorine gas can be used for the activation of the heterocyclic nitroxyl radical in the $1^{st}$ oxidation step in all embodiments and variants where chlorine dioxide is mentioned in this disclosure. The functionality of chlorine gas was verified in laboratory tests as follows: To a vessel, hypochlorite and sulfuric acid were introduced. Chlorine gas formed in these very acidic conditions. The chlorine gas was used for the activation of TEMPO catalyst, and the oxidation of cellulose with the hypochlorite as main oxidant was performed with this chlorine-activated catalyst successfully, with same selectivity as with chlorine-dioxide activated TEMPO catalyst.

The most selective way of running the oxidation according to the tests carried out so far is slow feeding of hypochlorite combined with feeding of NaOH chemical from the top of the reactor, which can be maintained in the range of pH 8, and minimizing the chemical loss caused by the decomposition of hypochlorite. At the beginning, more hypochlorite has to be supplied, and less hypochlorite at the end, because the reaction rate changes simultaneously when the number of free C6 hydroxyl groups in the cellulose pulp decreases. If the HOCl content in the process reduces to zero, the whole reaction will stop. Online detection of the HOCl content will considerably facilitate the implementation of selective oxidation. This operation mode can also be applied in other embodiments, in which hypochlorite is used as the main oxidant, irrespective of the pH range, in which the reaction is carried out.

The selectivity/efficiency can be described with the formula $(C_{CHO}+2C_{COOH})/C_{NaClO}$, in which $C_{CHO}$ ja $C_{COOH}$ are the molar contents of aldehydes and carboxylates and $C_{NaClO}$ the molar content of added hypochlorite (1 mol of aldehyde will consume 1 mol of hypochlorite, and carboxyl 2 mol of it). Calculated in this way, the reaction efficiencies for the bleached birch pulp described in the test have always been >50% (high oxidation degrees) and typically >70% and even >75 to 80%. The results obtained are at the same level with the results of a reaction catalyzed by sodium bromide (see, for example, Saito, T., Nishiyama, Y., Putaux, J.-L., Vignon, P., lsogai, A. Homogeneous suspensions of individualized microfibrils from TEMPO-catalyzed oxidation of native cellulose, *Biomacromolecules*, 7 (2006), 1687-1691) and show that a lower reaction rate and a higher temperature do not impair the reaction efficiency, when the other operating conditions can be controlled better.

The oxidation of C6 hydroxyl groups of cellulose is fastest at the beginning of the process when there are a lot of free reactive groups left. As the number of reactive groups decreases, the oxidation rate becomes lower and a significant change takes place when the number of free reactive groups (amorphous cellulose and part of crystalline cellulose) is very small and the oxidation is directed to the crystalline cellulose. Thus, the oxidation process primarily via degradation of the crystalline cellulose. FIG. 15, which was already discussed above, shows the acid value of TEMPO oxidations activated with chlorine dioxide as a function of hypochlorite dosage. Of the amorphous C6 OH groups, 83 to 98% are easily accessed; the corresponding figure in crystalline ranges is 10 to 15%. The graph shows that cellulose can be easily oxidized to the acid value range of 0.8 to 0.9 mmol of COOH per g of pulp. After this, the reaction rate becomes lower and the consumption of NaClO increases and the viscosity decreases as a result of degradation of polymers. The acid value range 0.8 to 0.9 can be kept as an optimum target for selective oxidation. When a lower reaction rate and a higher temperature are applied, the content of remaining aldehydes in the product after step 1 is typically <0.2 mmol per g of pulp, which is clearly lower than in a typical reaction in which the level is between 0.2 and 0.35 mmol per g of pulp. This is probably due to the lower reaction rate, wherein there is also more time for oxidation reactions of aldehydes to carboxylates to take place.

In the Tables 7, 8 and 9 above, oxidation reactions after steps 1 and 2 have been shown. In this fourth embodiment, step 2 is not necessary, because already step 1 will be sufficient for the oxidation. In most cases, step 2 can be recommended, however, to be used in the fourth embodiment, because in the step 2 also the residual aldehydes are oxidized into carboxylates, which stabilizes the product and increase the number of acid groups, making the fibrillation more efficient. For carrying out step 2, in which the oxidant is chlorite at pH 2 to 4, it is possible to apply the method described above in the second embodiment, advantageously the method described in the third embodiment, in which protective substances are used.

The invention claimed is:

1. A method for catalytic oxidation of cellulose comprising:
adding a heterocyclic nitroxyl compound as catalyst and main oxidant acting as oxygen source to the cellulose,
activating the heterocyclic nitroxyl compound to an active oxidized form,
oxidizing the cellulose through the active oxidized form of the heterocyclic nitroxyl compound, wherein
the activator is selected from tertiary amines and chlorine dioxide, where the tertiary amines are selected from hexamethylenetetramine, 1,4-diazabicyclo[2,2,2]octane (DABCO) and quinuclidine, and
hypochlorite is used as the main oxidant.

2. The method according to claim 1, wherein the cellulose is oxidized catalytically in one step where the tertiary amine is used as the activator.

3. The method according to claim 2, wherein during the oxidation pH is 7 to 10.

4. The method according to claim 1, wherein the cellulose is oxidized in two steps, where the chlorine dioxide is used as the activator and hypochlorite as the main oxidant in a first catalytic step and chlorite is used as oxidant completing the oxidation in a second step where the pH is lower compared with the first step.

5. The method according to claim 4, wherein during the first step pH is 6 to 10 and during the second step pH is 1.5 to 4.

6. The method according to claim 4, wherein during the first step the reaction rate is observed until a predetermined point is reached, whereafter the reaction is stopped by lowering the pH to that of the second step and proceeding with the second step, or washing the pulp and recovering the catalyst before the second step.

7. The method according to claim 4, wherein protective substance capable of inactivating the hypochlorous acid formed is used in the second step.

8. The method according to claim 7, wherein the protective substance is dimethyl sulfoxide (DMSO) or dimethyl sulfide (DMS).

9. The method according to claim 1, wherein chlorine oxide is used as the activator and the catalytic oxidation is performed at pH 7-9 and at temperature of 20-50° C.

10. The method according to claim 9, wherein the oxidation is performed in said conditions to a level of 0.5-1.0 mmol COOH/g pulp.

11. The method according to claim 9, wherein consistency of the pulp is above 4%.

12. The method according to claim 9, wherein the oxidation treatment is stopped after it is performed in said conditions, and the oxidized cellulose is treated further by disintegrating fibrous material containing the oxidized cellulose to nanofibrillated cellulose.

13. The method according to claim 9, wherein the oxidation treatment is continued in a second step with chlorite as oxidant completing the oxidation at a pH lower than in the first step.

14. The method according to claim 13, wherein the second step is performed at pH of 1.5 to 4.

15. The method according to claim 1, wherein the cellulose subjected to catalytic oxidation is cellulose in fibrous starting material.

16. Method for making a cellulose product, comprising
subjecting fibrous starting material to catalytic oxidation by the method according to claim 1 to obtain oxidized fibrous material, and
disintegrating the oxidized fibrous material.

17. The method according to claim 16, wherein the oxidized fibrous material is disintegrated to nanofibrillated cellulose (NFC).

18. The method according to claim 17, wherein the fibrils of the nanofibrillated cellulose have mean diameter of 5 to 15 nm and mean length of 0.5 to 2 μm.

19. The method according to claim 17, wherein the nanofibrillated cellulose has the turbidity below 70NTU (nephelometric turbidity units) as measured at 0.1% concentration in water.

20. The method according to claim 16, wherein the nanofibrillated cellulose has the zero shear viscosity of 5000 to 50000 Pa·s and yield stress of 8-40 Pa as measured at 0.5% concentration in water.

21. The method according to claim 16, wherein the carboxylate content of the oxidized cellulose is 0.9-1.4 mmol COOH/g pulp.

22. The method according to claim 3, wherein the pH is 8 to 9.5.

23. The method according to claim 3, wherein the pH is 8.5 to 9.0.

24. The method according to claim 5, wherein during the first step the pH is 7.5 to 8.5 and during the second step the pH is 2 to 3.

25. The method according to claim 10, wherein the oxidation is performed to a level of 0.6-0.95 mmol COOH/g pulp.

26. The method according to claim 10, wherein the oxidation is performed to a level of 0.7-0.9 mmol COOH/g pulp.

27. The method according to claim 11, wherein the consistency of the pulp is above 6%.

28. The method according to claim 11, wherein the consistency of the pulp is in the range of 8-12%.

29. The method according to claim 10, wherein the oxidation treatment is stopped after it is performed in said conditions, and the oxidized cellulose is treated further by disintegrating fibrous material containing the oxidized cellulose to nanofibrillated cellulose.

30. The method according to claim 11, wherein the oxidation treatment is stopped after it is performed in said conditions, and the oxidized cellulose is treated further by disintegrating fibrous material containing the oxidized cellulose to nanofibrillated cellulose.

31. The method according to claim 25, wherein the oxidation treatment is stopped after it is performed in said conditions, and the oxidized cellulose is treated further by disintegrating fibrous material containing the oxidized cellulose to nanofibrillated cellulose.

32. The method according to claim 26, wherein the oxidation treatment is stopped after it is performed in said conditions, and the oxidized cellulose is treated further by disintegrating fibrous material containing the oxidized cellulose to nanofibrillated cellulose.

33. The method according to claim 27, wherein the oxidation treatment is stopped after it is performed in said conditions, and the oxidized cellulose is treated further by disintegrating fibrous material containing the oxidized cellulose to nanofibrillated cellulose.

34. The method according to claim 28, wherein the oxidation treatment is stopped after it is performed in said conditions, and the oxidized cellulose is treated further by disintegrating fibrous material containing the oxidized cellulose to nanofibrillated cellulose.

35. The method according to claim 13, wherein the second step is performed at pH of 2 to 3.

36. The method according to claim 13, wherein protective substance capable of inactivating the hypochlorous acid formed is used in the second step.

37. The method according to claim 36, wherein the protective substance is dimethyl sulfoxide (DMSO) or dimethyl sulfide (DMS).

38. The method according to claim 1, wherein
the cellulose subjected to catalytic oxidation is cellulose in fibrous starting material, whereby oxidized fibrous material is obtained through the catalytic oxidation of cellulose, and
the oxidized fibrous material is disintegrated to nanofibrillated cellulose.

39. The method according to claim 2, wherein
the cellulose subjected to catalytic oxidation is cellulose in fibrous starting material, whereby oxidized fibrous material is obtained through the catalytic oxidation of cellulose, and
the oxidized fibrous material is disintegrated nanofibrillated cellulose.

40. The method according to claim 3, wherein
the cellulose subjected to catalytic oxidation is cellulose in fibrous starting material, whereby oxidized fibrous material is obtained through the catalytic oxidation of cellulose, and
the oxidized fibrous material is disintegrated nanofibrillated cellulose.

41. The method according to claim 4, wherein
the cellulose subjected to catalytic oxidation is cellulose in fibrous starting material, whereby oxidized fibrous material is obtained through the catalytic oxidation of cellulose, and
the oxidized fibrous material is disintegrated to nanofibrillated cellulose.

42. The method according to claim 5, wherein
the cellulose subjected to catalytic oxidation is cellulose in fibrous starting material, whereby oxidized fibrous material is obtained through the catalytic oxidation of cellulose, and
the oxidized fibrous material is disintegrated to nanofibrillated cellulose.

43. The method according to claim 6, wherein
the cellulose subjected to catalytic oxidation is cellulose in fibrous starting material, whereby oxidized fibrous material is obtained through the catalytic oxidation of cellulose, and
the oxidized fibrous material is disintegrated to nanofibrillated cellulose.

44. The method according to claim 7, wherein
the cellulose subjected to catalytic oxidation is cellulose in fibrous starting material, whereby oxidized fibrous material is obtained through the catalytic oxidation of cellulose, and
the oxidized fibrous material is disintegrated to nanofibrillated cellulose.

45. The method according to claim 22, wherein
the cellulose subjected to catalytic oxidation is cellulose in fibrous starting material, whereby oxidized fibrous material is obtained through the catalytic oxidation of cellulose, and
the oxidized fibrous material is disintegrated to nanofibrillated cellulose.

46. The method according to claim 23, wherein
the cellulose subjected to catalytic oxidation is cellulose in fibrous starting material, whereby oxidized fibrous material is obtained through the catalytic oxidation of cellulose, and
the oxidized fibrous material is disintegrated to nanofibrillated cellulose.

47. The method according to claim 24, wherein
the cellulose subjected to the catalytic oxidation is cellulose in fibrous starting material, whereby oxidized fibrous material is obtained through the catalytic oxidation of cellulose, and
the oxidized fibrous material is disintegrated to nanofibrillated cellulose.

* * * * *